US012581491B2

(12) United States Patent
Sun et al.

(10) Patent No.: US 12,581,491 B2
(45) Date of Patent: Mar. 17, 2026

(54) APPARATUS AND METHOD FOR TRANSMISSION AND RECEPTION OF CONTROL CHANNEL IN A COMMUNICATION SYSTEM

(71) Applicant: Samsung Electronics Co., Ltd., Suwon-si (KR)

(72) Inventors: Feifei Sun, Beijing (CN); Yi Wang, Beijing (CN); Sa Zhang, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 18/019,000

(22) PCT Filed: Aug. 4, 2021

(86) PCT No.: PCT/KR2021/010290
§ 371 (c)(1),
(2) Date: Jan. 31, 2023

(87) PCT Pub. No.: WO2022/031052
PCT Pub. Date: Feb. 10, 2022

(65) Prior Publication Data
US 2023/0284222 A1     Sep. 7, 2023

(30) Foreign Application Priority Data

Aug. 4, 2020    (CN) .......................... 202010774767.5
Apr. 2, 2021    (CN) .......................... 202110363860.1

(51) Int. Cl.
H04W 72/20       (2023.01)
H04B 1/713       (2011.01)
(Continued)

(52) U.S. Cl.
CPC ............ *H04W 72/20* (2023.01); *H04B 1/713* (2013.01); *H04L 1/08* (2013.01); *H04L 41/0803* (2013.01); *H04W 72/232* (2023.01)

(58) Field of Classification Search
CPC ..... H04W 72/00; H04W 72/20; H04W 72/21; H04W 4/20; H04W 72/231;
(Continued)

(56) References Cited

U.S. PATENT DOCUMENTS 10,555,346 B2    2/2020   Wang et al.
10,708,938 B2    7/2020   Papasakellariou
(Continued)

FOREIGN PATENT DOCUMENTS

CN        104811283 A        7/2015
CN        105991260 A        10/2016
(Continued)

OTHER PUBLICATIONS

Moderator (Apple Inc.), 'Summary #2 of [101-e-NR-L1enh-URLLC-PUSCH-02]', R1-2004981, 3GPP TSG RAN WG1 Meeting #101-e, Jun. 8, 2020.

(Continued)

*Primary Examiner* — Warner Wong
(74) *Attorney, Agent, or Firm* — Jefferson IP Law, LLP

(57) ABSTRACT

The present disclosure provides a transmission method of an uplink control channel, a corresponding user equipment, a base station and a computer-readable medium. The transmission method of the uplink control channel comprising: obtaining configuration information related to a nominal repetition; determining resource locations of one or more actual repetitions according to the configuration information related to the nominal repetition; and transmitting information according to the resource locations.

12 Claims, 16 Drawing Sheets

Obtain configuration information related to nominal repetition — 501

Determine resource locations of one or more actual repetitions according to configuration information related to nominal repetition — 502

Transmit information according to the resource locations — 503

(51) Int. Cl.

| | |
|---|---|
| *H04L 1/08* | (2006.01) |
| *H04L 41/0803* | (2022.01) |
| *H04W 72/232* | (2023.01) |

(58) Field of Classification Search

CPC ....... H04W 72/232; H04B 1/00; H04B 1/713; H04L 1/0023; H04L 1/1296; H04L 1/1607; H04L 1/1863; H04L 2027/0083; H04L 41/0803; H04L 41/0806; H04L 41/34; H04L 1/1816; H04L 1/189

See application file for complete search history.

(56) References Cited

U.S. PATENT DOCUMENTS

| | | | | |
|---|---|---|---|---|
| 11,025,372 | B2 | 6/2021 | Chen et al. | |
| 2008/0225965 | A1* | 9/2008 | Pi | H04B 7/068 |
| | | | | 714/800 |
| 2009/0313516 | A1* | 12/2009 | Shin | H04L 1/1806 |
| | | | | 714/748 |
| 2010/0262886 | A1* | 10/2010 | Ren | H04L 1/1819 |
| | | | | 714/751 |
| 2011/0045860 | A1* | 2/2011 | Nam | H04L 5/0023 |
| | | | | 455/507 |
| 2011/0099446 | A1* | 4/2011 | Murakami | H04L 1/0071 |
| | | | | 714/E11.131 |
| 2012/0057545 | A1* | 3/2012 | Hariharan | H04L 1/1685 |
| | | | | 370/329 |
| 2016/0285589 | A1* | 9/2016 | Mukkavilli | H04L 1/0045 |
| 2016/0337086 | A1 | 11/2016 | Shen et al. | |
| 2016/0338110 | A1* | 11/2016 | Wang | H04W 72/0446 |
| 2018/0192416 | A1* | 7/2018 | Yin | H04L 5/0053 |
| 2018/0192417 | A1* | 7/2018 | Yin | H04L 5/005 |
| 2019/0288787 | A1* | 9/2019 | Gao | H04L 1/12 |
| 2020/0015222 | A1* | 1/2020 | Huang | H04L 1/08 |
| 2020/0029325 | A1* | 1/2020 | Hwang | H04L 27/26 |
| 2020/0029335 | A1* | 1/2020 | Yang | H04W 52/54 |
| 2020/0205150 | A1* | 6/2020 | Cheng | H04W 72/21 |

| | | | | |
|---|---|---|---|---|
| 2020/0221478 | A1 | 7/2020 | Fakoorian et al. | |
| 2021/0226732 | A1* | 7/2021 | Yeo | H04L 1/18 |
| 2021/0297191 | A1* | 9/2021 | Takeda | H04L 1/1825 |
| 2022/0255705 | A1* | 8/2022 | Mu | H04W 72/0446 |
| 2022/0279517 | A1* | 9/2022 | Khoshnevisan | H04L 1/1858 |
| 2022/0353698 | A1* | 11/2022 | Jang | H04L 1/189 |
| 2023/0028762 | A1* | 1/2023 | Choi | H04L 5/0094 |
| 2023/0053388 | A1* | 2/2023 | Yamamoto | H04L 5/0053 |
| 2023/0085606 | A1* | 3/2023 | Shao | H04L 1/1861 |
| 2023/0133217 | A1* | 5/2023 | Li | H04W 72/21 |
| | | | | 370/329 |
| 2023/0171778 | A1* | 6/2023 | Kittichokechai | H04L 1/1671 |
| | | | | 370/329 |
| 2024/0237011 | A1* | 7/2024 | Huang | H04L 1/001 |
| 2025/0212213 | A1* | 6/2025 | Xiong | H04L 1/0075 |

FOREIGN PATENT DOCUMENTS

| | | |
|---|---|---|
| CN | 109923824 A | 6/2019 |
| CN | 110266433 A | 9/2019 |
| CN | 111294177 A | 6/2020 |
| KR | 10-2020-0069310 A | 6/2020 |
| WO | 2020/146672 A1 | 7/2020 |

OTHER PUBLICATIONS

3GPP; TSG RAN; Study on physical layer enhancements for NR URLLC (Release 16)', 3GPP TR 38.824 V16.0.0 (Mar. 2019), Mar. 27, 2019.

3GPP; TSG RAN; NR; Physical layer procedures for data (Release 16)', 3GPP TS 38.214 V16.2.0 (Jun. 2020), Jul. 20, 2020.

Moderator (NTT Docomo, Inc.), 'Summary on [101-e-NR-UEFeatures-TEIs-01]', R1-2004826, 3GPP TSG RAN WG1 #101-e, Jun. 8, 2020.

Chinese Office Action dated Apr. 27, 2025, issued in Chinese Patent Application No. 202110502315.6.

Chinese Office Action dated Sep. 30, 2025, issued in Chinese Patent Application No. 202110502315.6.

\* cited by examiner

Figure 2B:
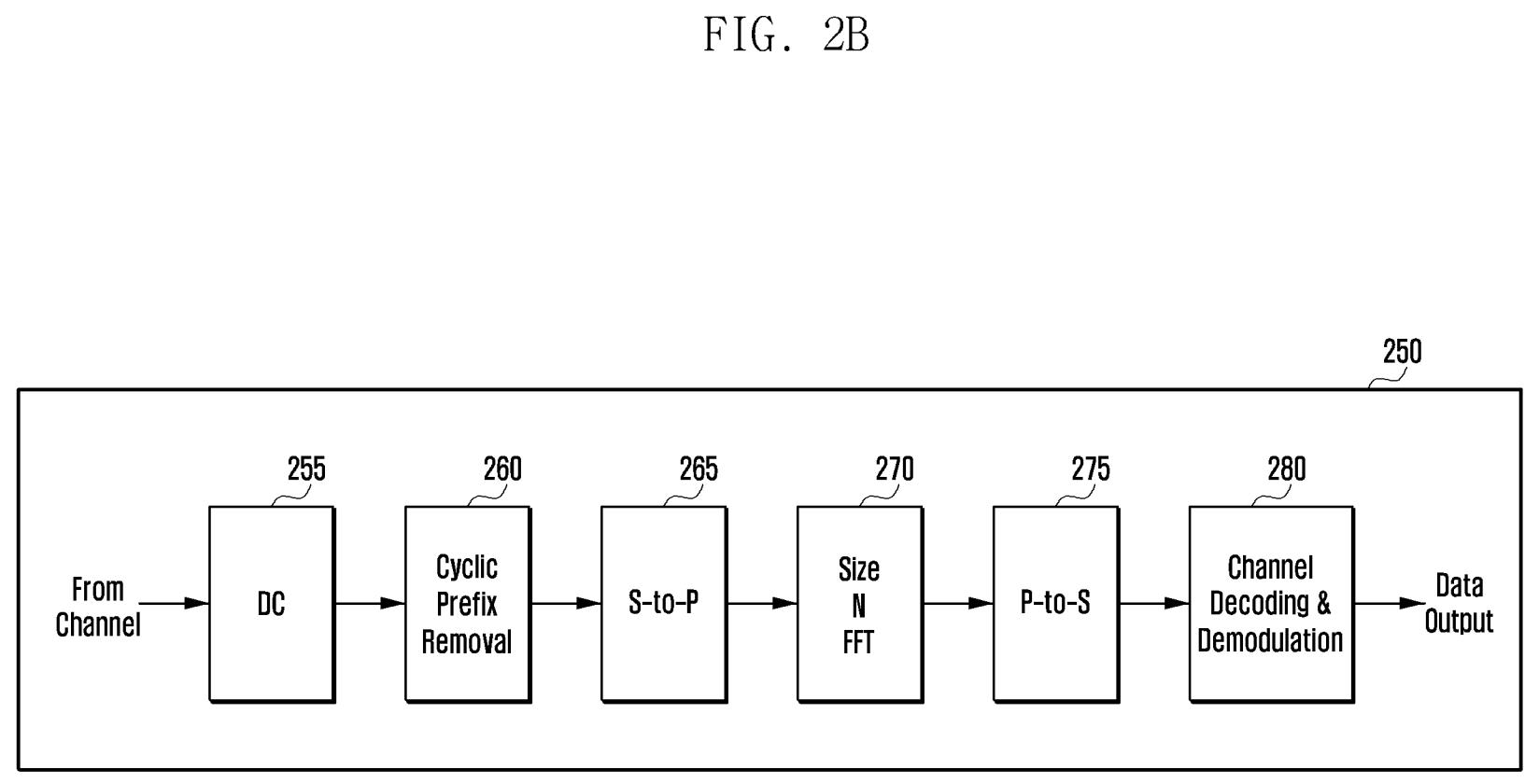

From Channel → DC (255) → Cyclic Prefix Removal (260) → S-to-P (265) → Size N FFT (270) → P-to-S (275) → Channel Decoding & Demodulation (280) → Data Output

| | |
|---|---|
| Obtain configuration information related to nominal repetition | 501 |
| Determine resource locations of one or more actual repetitions according to configuration information related to nominal repetition | 502 |
| Transmit information according to the resource locations | 503 |

Transmit configuration information related to nominal repetition    ~601

Determine resource locations of one or more actual repetitions according to the configuration information related to nominal repetition    ~602

Receive information according to the resource locations    ~603

FIG. 8

Figure 10:
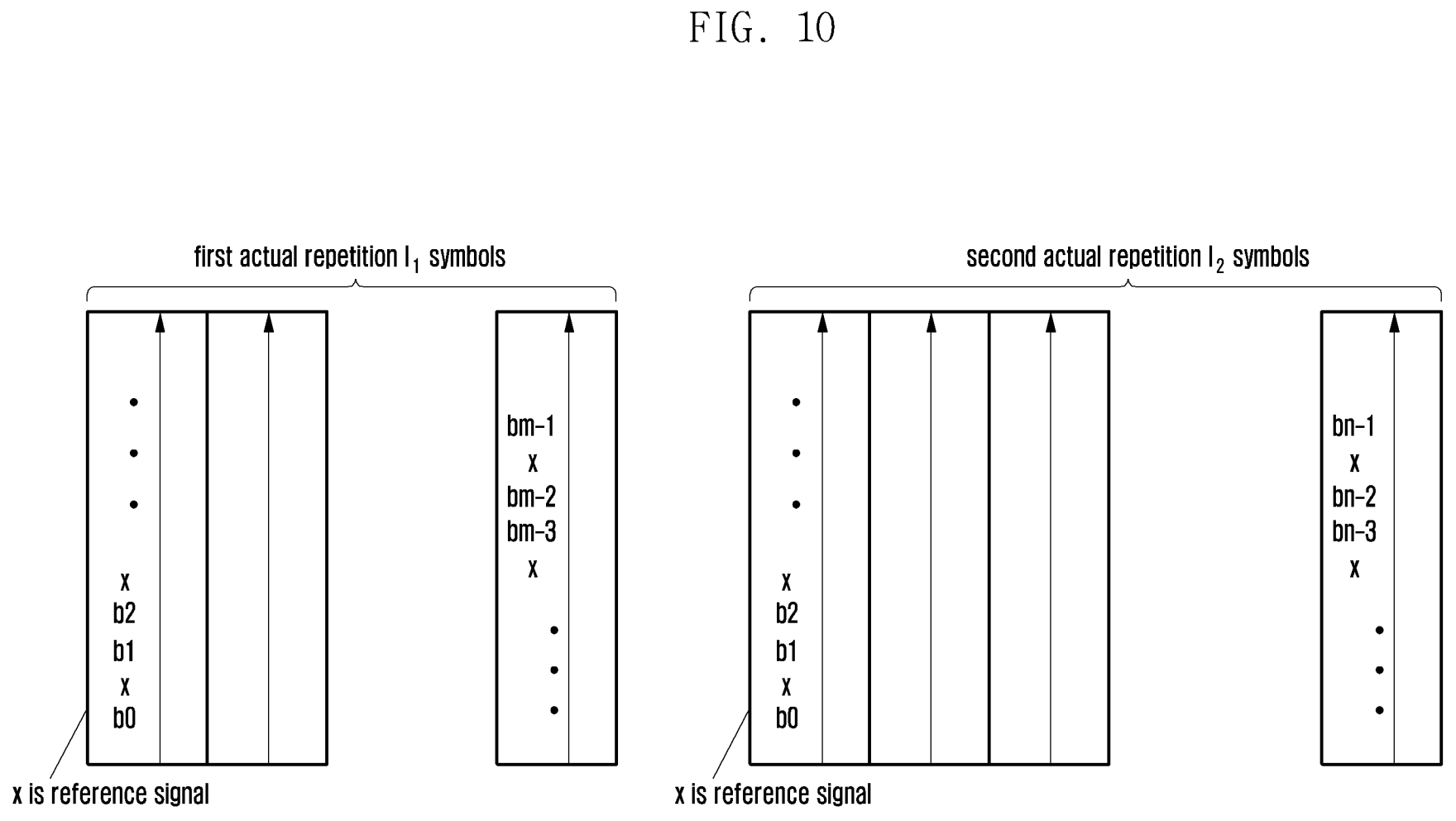

FIG. 10 first actual repetition $l_1$ symbols bm-1
x
bm-2
bm-3
x x
b2
b1
x
b0 x is reference signal x is reference signal second actual repetition $l_2$ symbols bn-1
x
bn-2
bn-3
x x
b2
b1
x
b0

APPARATUS AND METHOD FOR TRANSMISSION AND RECEPTION OF CONTROL CHANNEL IN A COMMUNICATION SYSTEM

TECHNICAL FIELD

The present application relates to mobile communication technology, and in particular, to a transmission method of an uplink control channel, a corresponding user equipment, a base station, and a computer-readable medium.

BACKGROUND ART

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna etc. are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

DISCLOSURE OF INVENTION

Technical Problem

For user terminals similar to wearable devices (for example, smart watches), due to the size limitation of the user terminal, there will be additional antenna loss compared to ordinary user terminals (for example, smart phones). In addition, this additional antenna loss will reduce the actual transmit power of the antenna of the user equipment and the received signal strength of the user equipment, thus affecting the coverage. In addition, due to the limited transmit power of user equipment, the uplink channel is the bottleneck of wireless network coverage. Therefore, the above-mentioned additional antenna loss will have a greater impact on the coverage of the uplink channel. Generally, the coverage of the uplink channel can be extended by means of repetition, etc., so as to achieve the effect of enhancing the coverage of the uplink channel. For the uplink data channel, this will cause a decrease in the data rate at the cell edge. For some specific services, such as URLLC (ultra-reliable and low-latency communications) service or voice over NR (VoNR) service that are sensitive to delay, it is necessary to complete feedback on the downlink channel within a certain period of time. Therefore, it is impossible to use repetition without restriction to increase the transmission time, that is, time delay. Because in 5G NR (new radio), the physical uplink control channel (PUCCH) only supports repetition between time slots. Repetition on each time slot occupies the same symbol position, which brings great restrictions on the flexibility of the transmission position of the PUCCH. For example, for a time division duplex (TDD) system, repetition between time slots cannot be well supported in a scenario where there are both downlink symbols and uplink symbols in one time slot. For another example, the PUCCH format 3 calculates the number of occupied frequency domain physical resource blocks (PRB) according to the information load. At the edge of the cell, this will cause the signal-to-interference-plus-noise ratio (SINR) of the receiving end to be too low, thereby affecting the detection and decoding performance of the receiving end. In addition, for high-frequency communication systems, such as >52.6 GHz, larger channel bandwidths and larger subcarrier spacing may be used.

Therefore, it is necessary to further optimize the transmission of the uplink control channel, for example, including but not limited to improving the decoding performance of the uplink control channel, and enhancing the coverage of the uplink control channel.

Solution to Problem

According to an aspect of the present invention, a transmission method of an uplink control channel is provided. The method comprises: obtaining configuration information related to a nominal repetition; determining resource locations of one or more actual repetitions according to the configuration information related to the nominal repetition; and transmitting information according to the resource locations.

According to an aspect of the present invention, a receiving method of an uplink control channel is provided. The method comprises: transmitting configuration information related to a nominal repetition; determining resource locations of one or more actual repetitions according to the configuration information related to the nominal repetition; and receiving information according to the resource locations.

Advantageous Effects of Invention

The method proposed in the present disclosure can improve the decoding performance of the uplink control channel, enhance the coverage of the uplink control channel, and reduce the delay of UCI transmission.

BRIEF DESCRIPTION OF DRAWINGS

The above and other aspects, features, and advantages of certain embodiments of the present disclosure will become clearer from the following description in conjunction with the accompanying drawings, in which:

FIGS. 2a and 2b illustrate example wireless transmission and reception paths according to the present disclosure;

FIG. 8 illustrates a repetition configuration according to another example embodiment of the present disclosure;

FIGS. 10 to 12 illustrate various ways of mapping symbols for transmitting information to resource elements (REs) on the time domain according to an example embodiment of the present disclosure.

MODE FOR THE INVENTION

Figure 1:
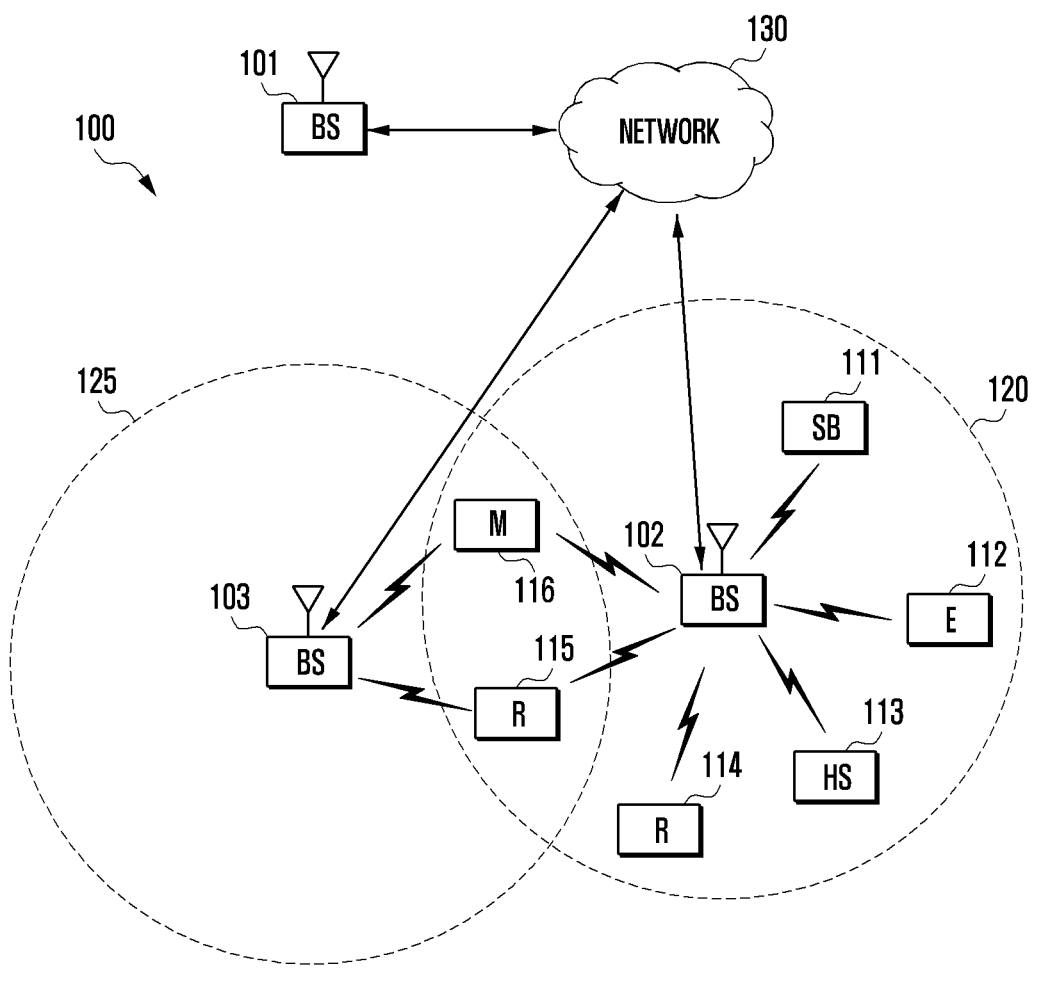
FIG. 1 illustrates an example wireless network in accordance with various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. The gNB 101 communicates with the gNB 102 and gNB 103. The gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
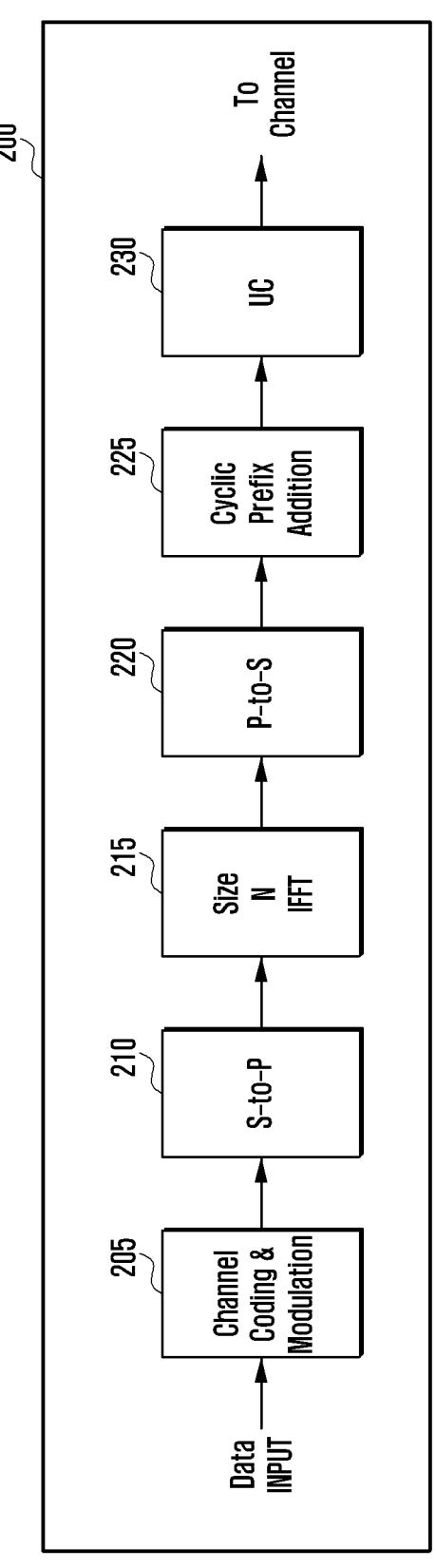

FIGS. 2a and 2b illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2a and 2b can be implemented using only hardware, or using a combination of hardware and software/firmware. As a specific example, at least some of the components in FIGS. 2a and 2b may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b can be combined, further subdivided or omitted, and additional components can be added according to specific requirements. Furthermore, FIGS. 2a and 2b are intended to illustrate examples of types of transmission and reception paths that can be used in a wireless network. Any other suitable architecture can be used to support wireless communication in a wireless network.

Figure 3A:
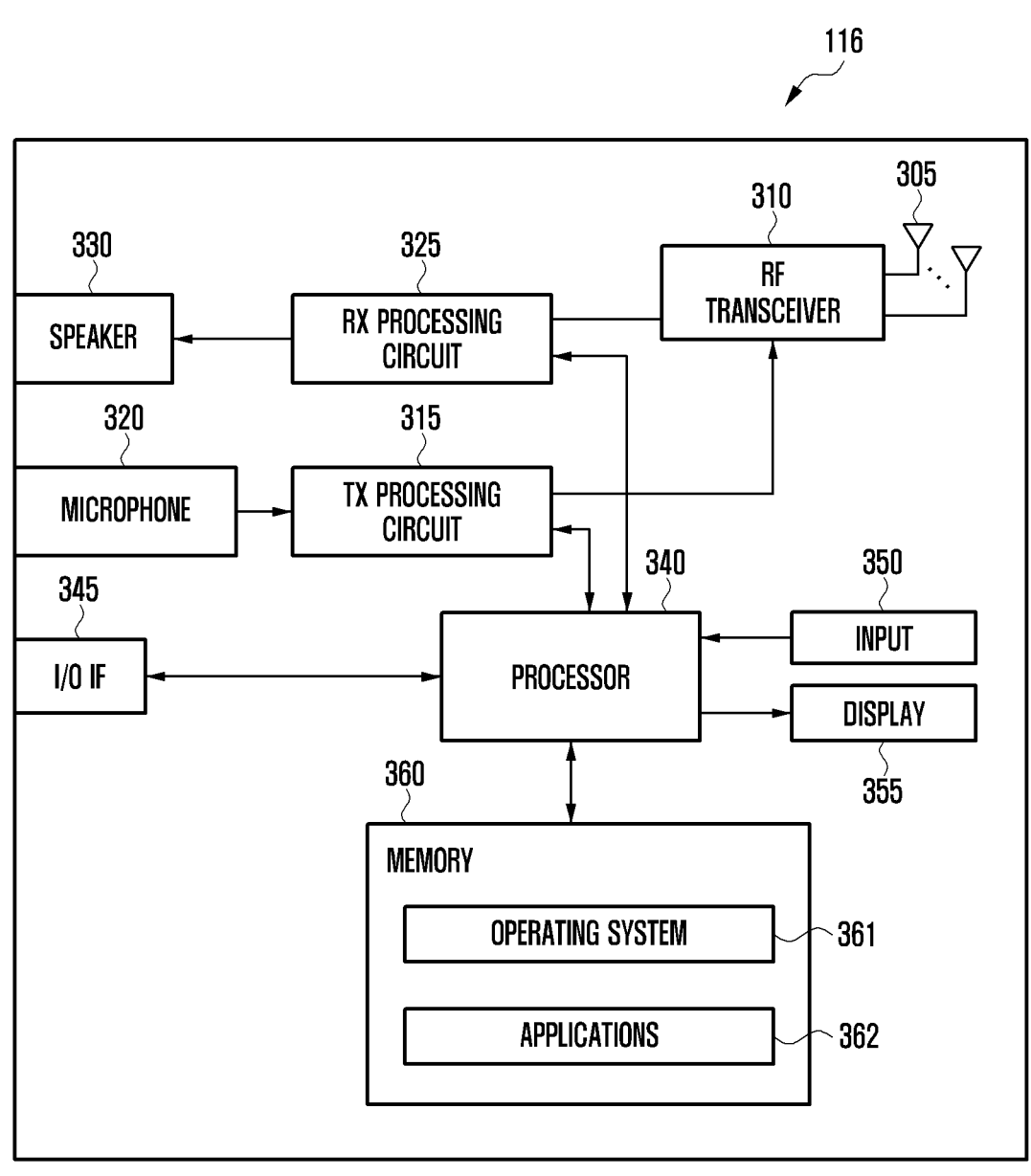
FIG. 3a illustrates an example UE according to the present disclosure.

FIG. 3a illustrates an example UE 116 according to the present disclosure. The embodiment of UE 116 shown in FIG. 3a is for illustration only, and UEs 111-115 of FIG. 1 can have the same or similar configuration. However, a UE has various configurations, and FIG. 3a does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3a illustrates an example of UE 116, various changes can be made to FIG. 3a. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a illustrates that the UE 116 is configured as a mobile phone or a smart phone, UEs can be configured to operate as other types of mobile or fixed devices.

Figure 3B:
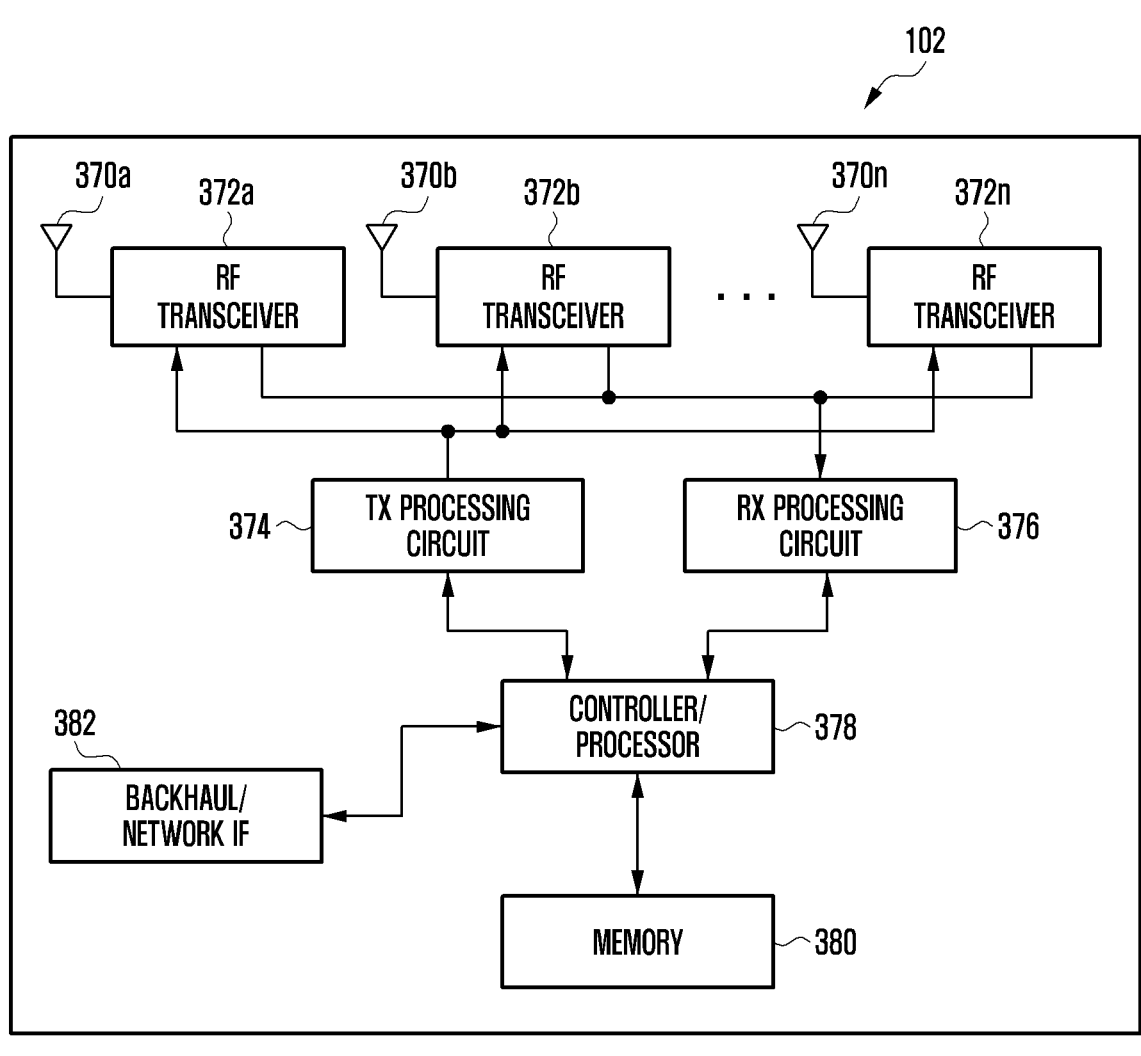
FIG. 3b illustrates an example gNB according to the present disclosure.

FIG. 3b illustrates an example gNB 102 according to the present disclosure. The embodiment of gNB 102 shown in FIG. 3b is for illustration only, and other gNBs of FIG. 1 can have the same or similar configuration. However, a gNB has various configurations, and FIG. 3b does not limit the scope of the present disclosure to any specific implementation of a gNB. It should be noted that gNB 101 and gNB 103 can include the same or similar structures as gNB 102.

As shown in FIG. 3b, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/ processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b. For example, gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Figure 4:
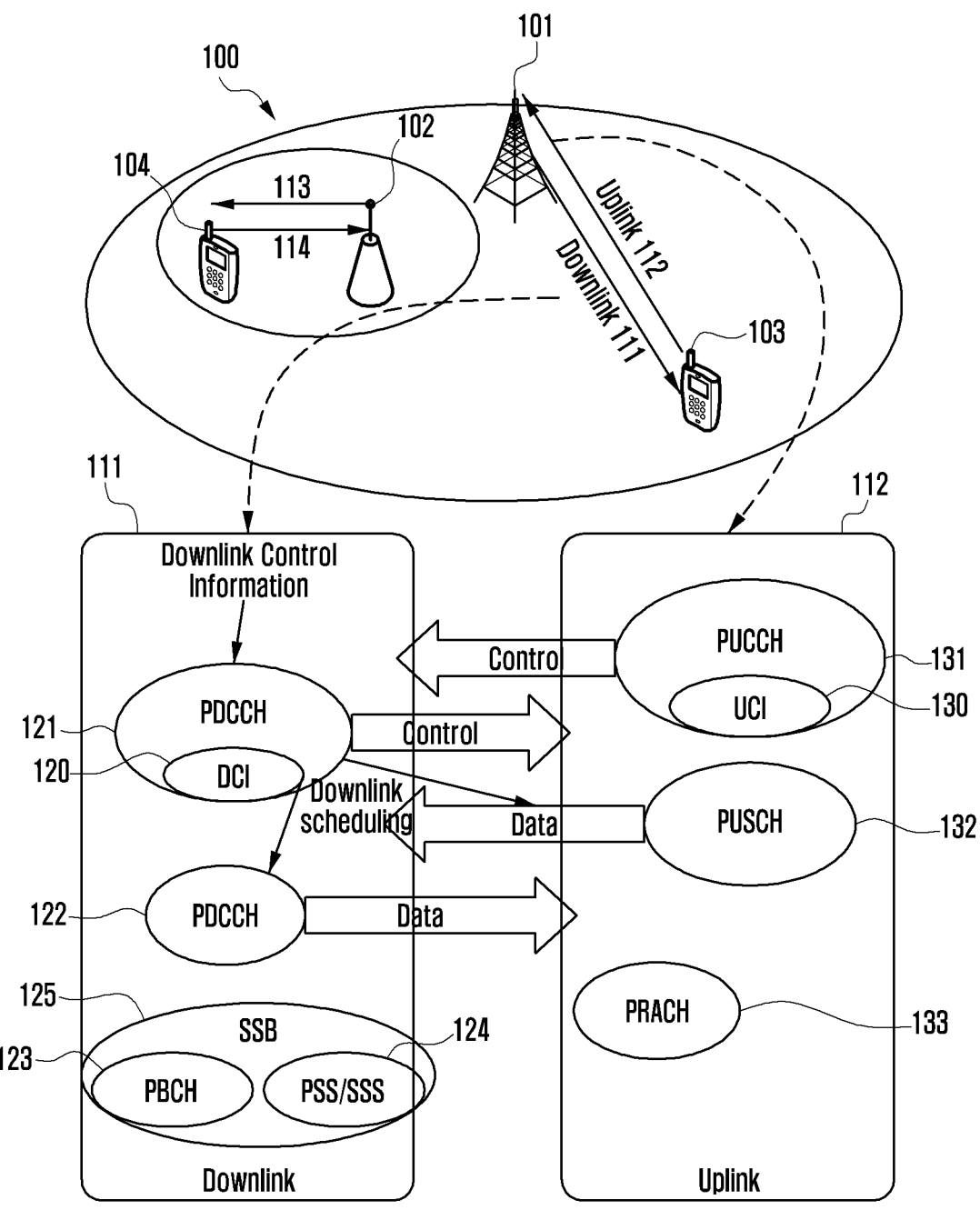
FIG. 4 schematically illustrates an example wireless communication system according to an exemplary embodiment of the present disclosure.

FIG. 4 illustrates an example of a wireless communication system 100 according to an embodiment of the present application, where the wireless communication system 100 includes one or more infrastructure units, thereby forming a communication network distributed in a certain geographical area. The wireless communication system 100 may be any type of communication system capable of using the inventive concept of the present disclosure.

According to an embodiment, the wireless communication system 100 may be an OFDM (Orthogonal Frequency Division Multiplexing) system/OFDMA (Orthogonal Frequency Division Multiple Access) system. The wireless communication network 100 may use OFDMA and/or multi-carrier architectures, including AMC (Adaptive Modulation and Coding) for downlink DL and next-generation single-carrier FDMA architecture or multi-carrier OFDMA architecture for uplink UL. Single carrier FDMA architecture includes IFDMA (interleaved frequency division multiple access), LFDMA (centralized frequency division multiple access), IFDMA or LFDMA DFTS-OFDM (DFT-spread OFDM, extended discrete Fourier transform orthogonal frequency division multiplexing). In addition, the wireless communication system 100 may also be various enhanced NOMA (Non-Orthogonal Multiple Access) architectures of the OFDMA system. An OFDMA system can serve remote units by allocating downlink or uplink radio resources that usually include a set of subcarriers on one or more OFDM symbols. Example OFDMA protocols include LTE and 5G NR developed in the 3GPP UMTS standard, and series of standards in the IEEE standard, such as IEEE 802.16. The architecture can also include the use of various transmission technologies, such as MC-CDMA (multi-carrier CDMA), MC-DS-CDMA (multi-carrier direct sequence code division multiple access), OFCDM (orthogonal frequency code division multiplexing for one-dimensional or two-dimensional transmission). Alternatively, simpler time division and/or frequency division multiplexing/multiple access technologies can be used, or a combination of these different technologies. In an alternative embodiment, the communication system may use other cellular communication system protocols, including but not limited to TDMA (time division multiple access) or direct sequence CDMA (code division multiple access).

Infrastructure units may include AP (access point), AT (access terminal), BS (base station), Node-B (node B), eNB (evolved NodeB, evolved base station), gNB (next generation base station), etc. Other terms in this technical field can also be used.

The wireless communication system 100 may include base stations 101 and 102 and user equipment 103 and 104. The base stations 101 and 102 provide services for the user equipment 103 and 104 in their service area. The service area may be within the range of a cell or a cell sector. In some systems, one or more base stations may be communicatively coupled to a controller forming an access network, and the controller may be communicatively coupled to one or more core networks. The present disclosure is applicable to, but not limited to, any of the above-mentioned wireless communication systems.

As shown in FIG. 4, in the time domain and/or frequency domain, base stations 101 and 102 communicate with user equipment 103 and 104 through downlink DL communication signals 111 and 113, and uplink UL communication signals 112 and 114, respectively.

When the base station has a downlink packet to transmit to the UE, each UE will obtain a downlink allocation (resource), such as a set of radio resources in the PDSCH (Physical Downlink Shared Channel). When the UE needs to transmit a packet to the base station in the uplink, the UE may obtain an authorization from the base station, where the authorization allocation may include the PUSCH (Physical Uplink Shared Channel) of a set of uplink radio resources. The UE may obtain downlink or uplink scheduling information from its own PDCCH (physical downlink control channel). In addition, the downlink or uplink scheduling information and other control information carried by the PDCCH may be referred to as DCI (Downlink Control Information).

FIG. 4 also illustrates different physical channels of the example downlink 112 and uplink 111. The downlink 112 may include PDCCH 121, PDSCH 122, PBCH (Physical Broadcast Channel) 123, and PSS (primary synchronization signal)/SSS (second synchronization signal or secondary synchronization signal) 124. In 5G NR, PSS, SSS, and PBCH together form one SSB (SS/PBCH block) 125. The PDCCH 121 may transmit the DCI 120 to the UE, that is, the DCI 120 is carried by the PDCCH 121. The PDSCH 122 transmits downlink data information to the UE. PBCH may carry MIB (Master Information Block) for early UE discovery and cell-wide coverage. The uplink 111 may include PUCCH (Physical Uplink Control Channel) 131 carrying UCI (Uplink Control Information) 130, PUSCH 132 carrying uplink data information, and PRACH (Physical Random Access Channel) 133 carrying random access information.

The 5G NR system defines five PUCCH formats, namely PUCCH format 0 to PUCCH format 4, which are suitable for different payloads and different coverage. For example, PUCCH format 0 and PUCCH format 1 are applicable to 1-2 bits. PUCCH format 0 occupies 1 to 2 symbols, while PUCCH format 1 occupies 4 to 14 symbols, and PUCCH format 1 supports additional repetition between time slots. Similarly, PUCCH format 2/3/4 is suitable for UCI with more than 2 bits. Format 2 is a short PUCCH, which only occupies 1-2 symbols, and PUCCH formats 3 and 4 are long PUCCH, which occupies 4 to 14 symbols, and may additionally support repetition between time slots.

However, because the repetition between time slots of the PUCCH format 1/3/4 occupies the same symbol position in each time slot, in the TDD scenario, as the uplink symbol positions in different time slots may be different, thus, it cannot use all uplink channel symbols for PUCCH transmission as much as possible.

In order to make better use of all the symbols of the uplink channel, a "mini-slot" repetition similar to PUSCH type B repetition can be introduced for the PUCCH. For PUSCH type B repetition, the position of the first nominal repetition and the number of repetitions may be indicated by the base station. Based on this, the UE determines the position of the first nominal repetition, and determines the position of each subsequent nominal repetition according to the number of nominal repetitions, where each nominal repetition is connected back to back. When semi-static downlink symbols or invalid symbols appear, the nominal repetition may be segmented into one or more actual repetitions. That is, the actual repetition is only performed on consecutive valid symbols. Therefore, the number of symbols of each actual repetition may be the same or different. For PUSCH, rate matching is performed for each actual repetition, but for PUCCH, because of the different carrying methods of PUCCH information in different formats (such as using different sequences, or modulation and demodulation methods of the sequences), the method of PUSCH type B repetition cannot be directly applied. It should be noted that the information carried via the PUCCH includes not only control information but also data information and other information suitable for transmission on such an uplink control channel.

Figure 5:
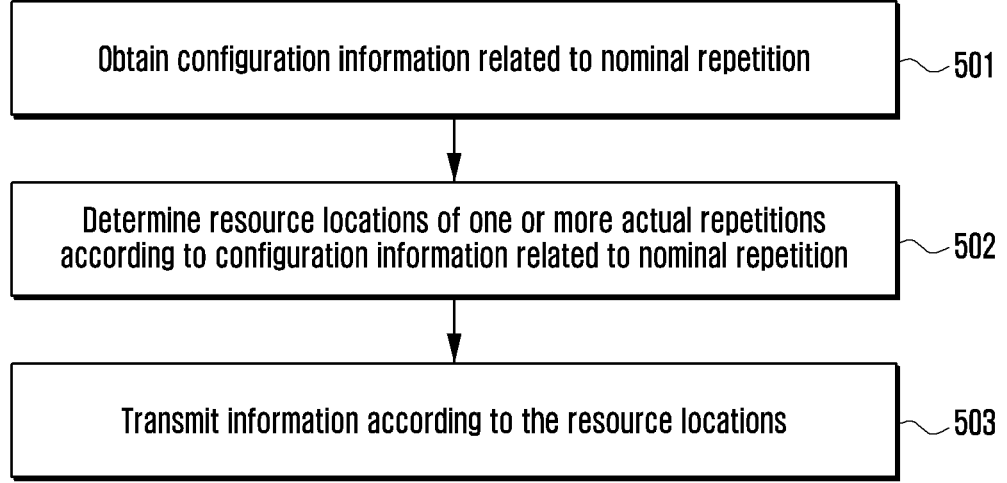
FIG. 5 is a flowchart of a transmission method of an uplink control channel according to an example embodiment of the present disclosure.

FIG. 5 is a flowchart of a transmission method of an uplink control channel according to an example embodiment of the present disclosure. In step 501, the user equipment may obtain configuration information related to a nominal repetition. In step 502, the user equipment may determine resource locations of one or more actual repetitions according to the configuration information related to the nominal repetition. In step 503, the user equipment may transmit information according to the resource locations. It should be noted that the determined resource location of the actual repetition may be consistent with the resource location of the nominal repetition. In other words, the user equipment may determine the time domain resource location of the nominal repetition as the time domain resource location of the actual repetition, that is, transmit information on the resource location of the nominal repetition.

Figure 6:
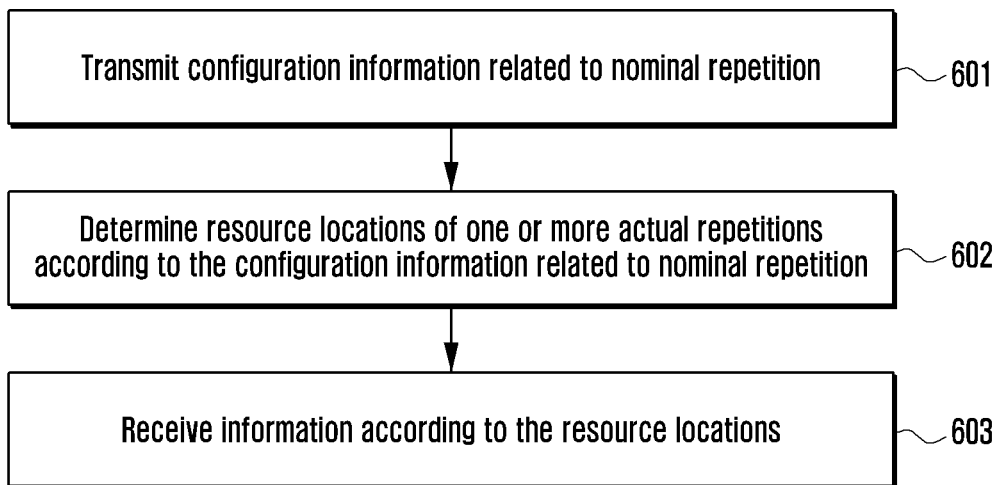
FIG. 6 is a flowchart of a receiving method of an uplink control channel according to an example embodiment of the present disclosure.

FIG. 6 is a flowchart of a receiving method of an uplink control channel according to an example embodiment of the present disclosure. In step 601, the base station may transmit configuration information related to the nominal repetition. In step 602, the base station may determine resource locations of one or more actual repetitions according to the configuration information related to the nominal repetition. In step 603, the base station may receive information according to the resource locations.

In the following, different adaptive methods for continuous repetition are given according to each PUCCH format. These methods can improve PUCCH coverage performance and reduce transmission delay.

PUCCH format 0 coveys 1-2 bits of information for transmission through different sequences, and occupies 1-2 symbols. For the configuration with two symbols, the transmission is carried out in the manner of repetition in time slots (that is, the same as the transmission on the first symbol). PUCCH format 2 is used for 1-2 symbols to transmit more than 2 bits of information. It may occupy 1 to 16 PRBs in the frequency domain and use CP-OFDM (Cyclic Prefix Orthogonal Frequency Division Multiplexing) waveforms for transmission. In this way, for PUCCH of one symbol, the DMRS (demodulation reference signal) occupies the 1/4/7/10th sub-carrier position, and the overhead of the fixed DMRS is 1/3. In order to extend the reliability or coverage of the PUCCH, continuous repetition of PUCCH format 0 and format 2 can be introduced, or more symbols can be supported.

Figure 7:
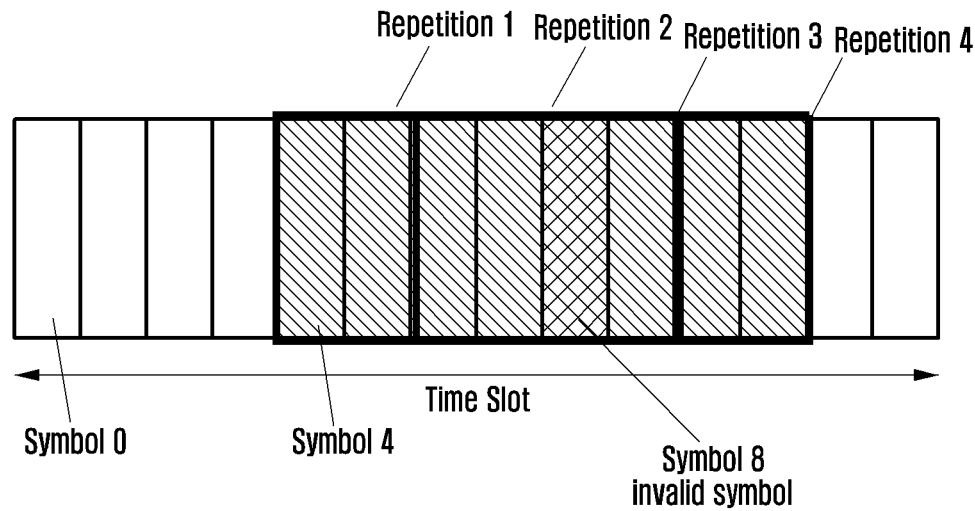
FIG. 7 illustrates a repetition configuration according to an exemplary embodiment of the present disclosure.

FIG. 7 illustrates a repetition configuration according to an exemplary embodiment of the present disclosure. PUCCH format 0 or format 2 can directly apply the method of PUSCH type B to handle PUCCH transmission of invalid symbols. Alternatively, the transmission related to the invalid symbol can be directly discarded. The discarded transmission may be one or more complete nominal or actual repetitions or partial nominal or actual repetitions. As shown in FIG. 7, according to the configuration of the base station, the UE may obtain the first nominal repetition of PUCCH format 0 or format 2, starting from symbol 4, and occupying 2 symbols, with a total of 4 repetitions. The symbol 8 is an invalid symbol. Then, the four nominal repetitions of PUCCH occupies symbols starting from symbol 4, and the repetitions are performed in units of 2 transmission blocks 4 times, occupying 8 symbols from symbol 4 to symbol 11. Because the symbol 8 is an invalid symbol, part of the repetition on symbol 8 may be discarded. Similarly, if an invalid symbol appears in a nominal repetition, after discarding the transmission related to the invalid symbol one nominal repetition may be segmented into one or more actual repetitions. As shown in FIG. 7, after discarding the related transmission of symbol 8, the third nominal repetition is segmented into one actual repetition with symbol length of 1. Similarly, in another example, if one nominal repetition occupies four symbols from symbol 6 to symbol 9, then invalid symbol 8 will segment the one nominal repetition into one actual repetition occupying symbols from symbol 6 to symbol 7, and one actual repetition occupied symbol 9.

The invalid symbols are pre-defined or configured by the base station as one or more of the followings: valid (or invalid) symbol patterns; semi-statically configured downlink and/or flexible symbols; the symbol where CORESET 0 is located as an invalid symbol indicated by synchronization signal and PBCH block (SSB) and/or master information block (MIB); several symbols after the downlink and/or flexible symbol; downlink and/or flexible symbol dynamically indicated by DCI.

For PUCCH format 0 or format 2, there is essentially no difference between repetition with 1 or 2 symbols as a unit and direct configuration of more symbols. Therefore, the base station may directly configure the number of symbols occupied by PUCCH format 0 (equivalent to repetition in a unit of 1 symbol). At this time, the number of symbols may be the number of symbols of the actual repetition (that is, postponed when the invalid symbol appears), or the number of symbols may be the number of symbols of the nominal repetition (that is, discarded when the invalid symbol appears). Similarly, the base station can directly configure the number of symbols occupied by PUCCH format 2 (it can support transmission of PUCCH format 2 with less than or equal to 2 symbols and/or more than 2 symbols). Then, for the method of directly configuring the number of symbols occupied by PUCCH format 2, the UE can determine the coding rate of UCI according to the number of resource elements (REs) corresponding to all the configured symbols.

Figure 8:
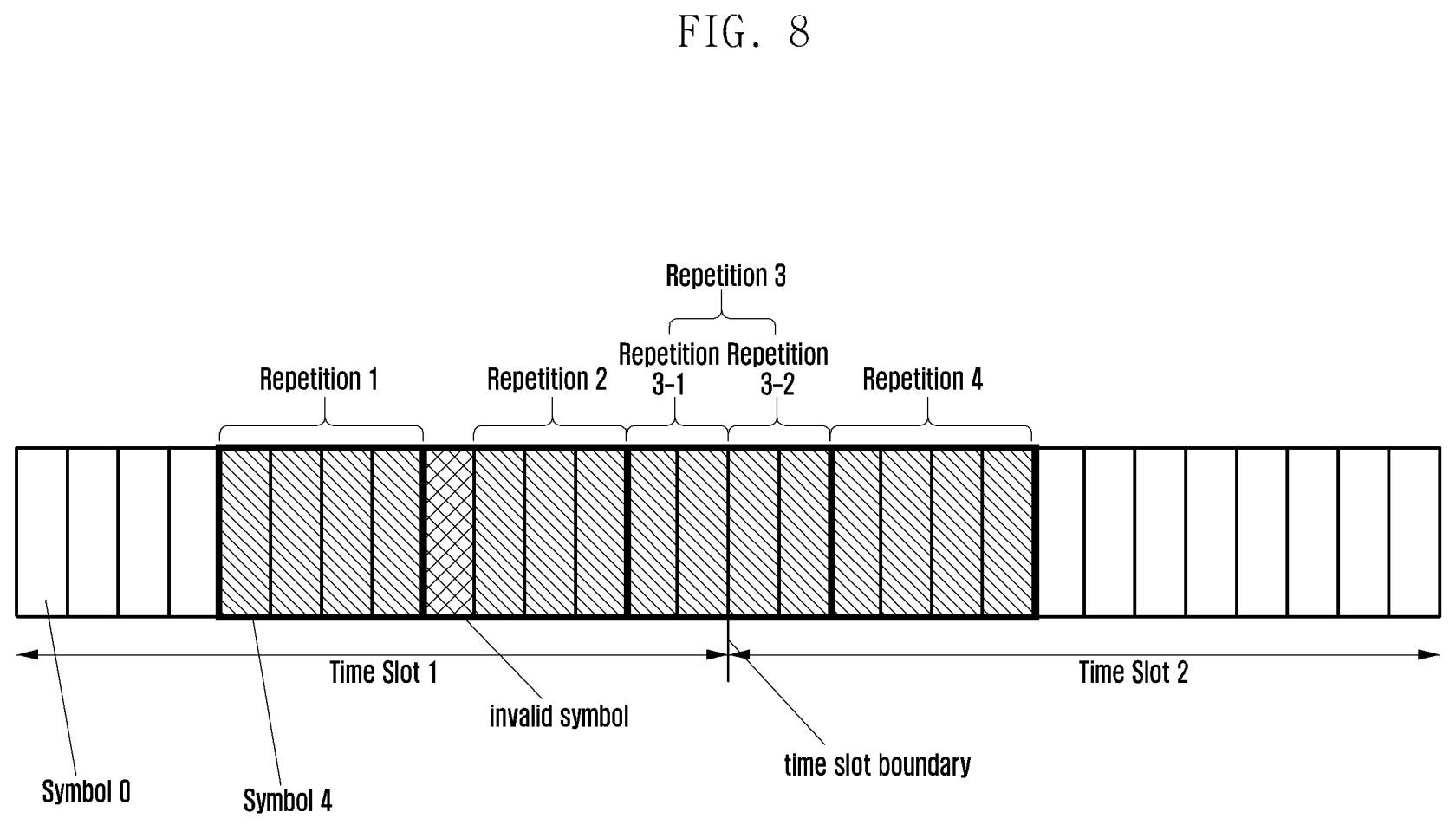

FIG. 8 illustrates a repetition configuration according to another example embodiment of the present disclosure. PUCCH format 1 is composed of DMRS and modulation information, which may occupy 4 to 14 symbols. PUCCH format 1 also carries 1-2 bits of information. After modulating by BPSK or QPSK, a computer-generated sequence is used for spreading in the frequency domain. Then, the spread spectrum is carried out in the time domain according to the position of the occupied symbol. In the time domain, 1 PRB is also occupied. PUCCH format 1 supports time slot repetition, that is, the same symbol position is occupied for transmission on each time slot. However, this makes it impossible to transmit in the time slot if there are some invalid symbols in the corresponding position on a certain time slot in the time slot repetition, or each time slot repetition cannot be configured to transmit on these invalid symbols. This leads to a decrease in coverage performance or a greater delay.

Similarly, PUCCH format 1 may be continuously retransmitted in mini-slots. In order to maintain a certain multi-user multiplexing capability, a time-domain spreading code can be selected for the number of symbols of each actual repetition. As shown in FIG. 4, UE may obtain from the base station that the position of the first nominal repetition of the PUCCH starts from symbol 4 of time slot 1, each transmission has 4 symbols, and 4 repetitions are performed, of which the symbol 8 of the first time slot is an invalid symbol. Then the first nominal repetition occupies symbols 4~7 of slot 1, the second nominal repetition occupies symbols 8~11 of slot 1, the third nominal repetition occupies symbols 12-13 of slot 1 and symbols 0~1 of slot 2, and the fourth nominal repetition occupies 3~6 of slot 2. Since the symbol 8 in the second nominal repetition is an invalid symbol, the second nominal repetition is segmented into one actual repetition occupying symbols 9-11. Since the third nominal repetition crosses the time slot boundary, one nominal repetition needs to be segmented into two actual repetitions, occupying symbols 12-13 of the time slot 1 and symbols 0~1 of time slot 2 respectively.

Orthogonal Codes $w_i(m)=e^{j2\pi\phi(m)/T}$

14

0~3 of time slot 2, and the fourth nominal repetition occupies 4~7 of time slot 2. This method is also applicable to PUCCH format 2 described above. This method can ensure that the number of available REs in each nominal or actual repetition is equal, without additional special processing for Polar rate matching and mapping, thereby reducing complexity.

TABLE 1

| T | i = 0 | i = 1 | i = 2 | i = 3 | i = 4 | i = 5 | i = 6 |
|---|---|---|---|---|---|---|---|
| | | | | $\phi$ | | | |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

The time domain spreading sequence is selected according to the symbols of the actual repetition. Assuming that the base station may configure the codeword i=1 for the UE, obtain a column corresponding to the codeword i=1 and the symbol length T according to the predefined table 1 to find out the corresponding phase $\phi(m)$ used to calculate to each symbol of the orthogonal code $w_i(m)=e^{j2\pi\phi(m)/T}$. Specifically, the first and fourth nominal repetitions and actual repetitions use the same T=4 symbols, then the phase sequence $\phi(m)=[2\ 0\ 2]$ for generating the orthogonal code is obtained according to the look-up table to calculate the orthogonal code $w_i(m)=e^{j2\pi\phi(m)/T}$. There is one actual repetition with 3 symbols in the second nominal repetition, then the phase sequence $\phi(m)=[0\ 1\ 2]$ corresponding to T=3 is used. There are two actual repetitions 3-1 and 3-2 with symbol length of 2 in the third nominal repetition, then the phase sequence $\phi(m)=[0\ 1]$ corresponding to T=2 is used.

In another example, there is no need to segment into two actual repetitions at slot boundary. In this way, in the example shown in FIG. 8, although the third nominal repetition meets the slot boundary, it does not need to be segmented into two repetitions. That is, the third nominal repetition is the same as the actual repetition, and the phase sequence $\phi(m)=[0\ 2\ 0\ 2]$ corresponding to T=4 is used.

Figure 9:
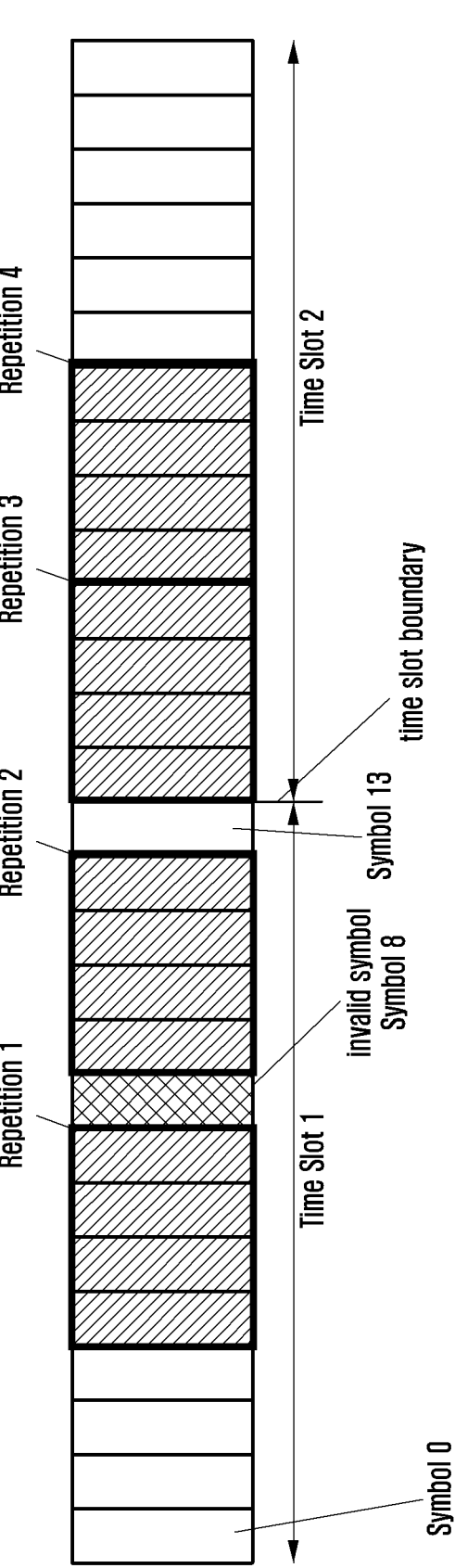
FIG. 9 illustrates a repetition configuration according to another example embodiment of the present disclosure.

FIG. 9 illustrates a repetition configuration according to another example embodiment of the present disclosure. According to one embodiment, when meeting invalid symbols and/or slot boundaries so that the number of consecutive symbols (effective symbols) that can be used is less than the number of symbols required for one repetition, the repetition (one transmission) can be postponed until it meets a set of valid symbols that can carry the entire repetition, but because each transmission has the same number of symbols, it is relatively easy to multiplex PUCCH resources. However, this method introduces additional time delay. As shown in FIG. 9, UE may obtain from the base station that the position of the first nominal repetition of the PUCCH starts from the symbol 4 of time slot 1, each transmission has 4 symbols, and 4 repetitions are performed, of which the symbol 8 of the first time slot is an invalid symbol. Then the first nominal repetition occupies symbols 4~7 of slot 1, the second nominal repetition occupies symbols 9~12 of slot 1. Since there is only symbol 13 left in time slot 1, which is less than the number of symbols required for one nominal repetition, the third nominal repetition occupies the symbols In addition, after determining the symbol position occupied by each nominal repetition, multiple symbols used for PUCCH transmission in a certain time unit (each time slot) can be combined into one actual repetition, thereby improving multiplexing rate. Referring again to the example of FIG. 8, all consecutive symbols in each slot can be combined. For example, the repetition 2 in time slot 1 and the repetition 3-1 in time slot 1 can be combined into one actual repetition with 5 symbols. The repetition 3-2 and the repetition 4 in the time slot 2 can be combined into one actual repetition with 6 symbols. If the base station may configure codeword i=1 for the UE, according to Table 1, the two actual repetitions respectively use the phase sequence [0 1 2 3 4] corresponding to T=5 and the phase sequence [0 1 2 3 4 5] corresponding to T=6. The advantage of this method is that it can make the transmission of PUCCH more regular, which is convenient to support more UEs. In addition, different UEs are multiplexed in different time slots or actual repetitions, so as to improve capacity.

Each nominal or actual repetition in the foregoing repetition method may carry different UCI information, for example, some nominal or actual repetitions may carry HARQ-ACK/NACK, scheduling request SR, CSI, etc. Alternatively, some nominal or actual repetitions may carry high-priority UCI, some nominal or actual repetitions may carry low-priority UCI, etc.

The above-mentioned continuous repetition method can also be applicable to PUCCH format 3 and format 4. In particular, for PUCCH transmission of the DFTS-OFDM waveform, the position of the DMRS needs to be determined. The position of the DMRS may determine its relative position in the nominal repetition according to the symbol length of each nominal repetition. Alternatively, the position of the DMRS may determine its relative position in the actual repetition according to the symbol length of each actual repetition. The latter can ensure that there are DMRS that can be used for demodulation in each actual repetition.

For PUCCH format 0 or format 2 or repetition of PUCCH format 0 or format 2 that supports more symbols, at least one of the following frequency hopping methods may be supported:

Frequency hopping between each nominal or actual repetition (frequency hopping is performed in units of each nominal or actual repetition).

Taking FIG. 8 as an example, frequency hopping may be performed in units of nominal repetitions. The first hop is the first nominal repetition occupying symbols 4~7 of time slot 1, the second hop is the second nominal repetition occupying symbols 8~11 of time slot 1, the third hop is the third nominal repetition occupying the symbols 12-13 of time slot 1 and symbols 0~1 of time slot 2, and the fourth hop is the fourth nominal repetition occupying symbols 3 to 6 of time slot 2.

Taking FIG. 8 as an example, frequency hopping may be performed in units of actual repetitions. For example, The first hop is the first actual repetition occupying symbols 4~7 of time slot 1, the second hop is the second actual repetition occupying symbols 9~11 of time slot 1, the third hop is the third actual repetition occupying the symbols 12-13 of time slot 1, the fourth hop is the fourth actual repetition occupying symbols 0~1 of time slot 2, and the fifth hop is the fifth actual repetition occupying symbols 3 to 6 of time slot 2.

Frequency domain frequency hopping between occupied time slots (frequency hopping is performed in units of time slots when crossing multiple time slots).

Taking FIG. 8 as an example, frequency hopping may be performed in units of time slots. The first hop is the actual repetition occupying symbols 4~7 of slot 1, occupying symbols 8~11 of slot 1, and occupying symbols 12-13 of slot 1; the second hop is the actual repetition occupying symbols 0~1 of slot 2 and occupying symbols 3~6 of time slot 2.

Frequency domain frequency hopping according to the first half and the second half of the number of symbols actually occupied in each time slot.

Taking FIG. 7 as an example, frequency hopping may be performed in units of the first half and the second half of the number of symbols occupied in each time slot. As shown in FIG. 7, all repetitions are in the same time slot, and the nominal repetition occupies a total of 8 symbols (the actual repetition occupies 7 symbols). The first hop is symbols 4~7; the second jump is symbols 8-11. The symbol 8 is not actually retransmitted. At this time, the first hop occupies half of the number of symbols L' occupied by all nominal repetitions in one time slot, namely $[L'/2]$, and the second hop occupies $L'-[L'/2]$ Symbols. Alternatively, the round-down in the previous formula can be replaced with round-up. In another example, the symbols number L' of all nominal repetitions in one time slot may be replaced with the number of symbols occupied by all actual repetitions in one time slot. One time slot may be replaced with other time units, for example, the number of symbols occupied by all nominal or actual repetitions.

Frequency hopping is performed in units of half symbols of each nominal or actual repetition.

Taking FIG. 7 as an example, frequency hopping may be performed in units of half symbols in each nominal repetition. Each nominal repetition occupies 2 symbols, so the first hop is the first half symbol of the first nominal repetition, that is, symbol 4, and the second hop is the second half symbol of the first nominal repetition, that is, symbol 5. Similarly, the third and fourth hops are symbols 6 and 7 of the second nominal repetition; the fifth and sixth hops are symbols 8 and 9 of the third nominal repetition; and so on. Symbol 8 is an available symbol, and no actual repetition is performed.

Taking FIG. 7 as an example again, frequency hopping can be performed in units of half symbols in each actual repetition. Then, the first hop is the first half symbol of the first actual repetition, namely symbol 4, and the second hop is the second half symbol of the first actual repetition, namely symbol 5. The third and fourth hops are the symbols 6 and 7 of the second actual repetition; since there is only one symbol of the third actual repetition, the fifth hop is symbol 9 of the third actual repetition; the sixth and seventh hops are the symbol 10 and the symbol 11 of the fourth actual repetition.

That is, the first hop occupies half of the number of symbols L' in each nominal or actual repetition, that is, $[L'/2]$, and the second hop occupies the other half, that is, $L'-[L'/2]$ symbols.

Frequency hopping is performed according to the number of symbols of time-domain bundling configured by the base station (the number of symbols of time-domain bundling configured by the base station, and one time-domain bundling is used as the time unit for frequency hopping).

Taking FIG. 7 as an example, the base station may configure the number of symbols of time-domain bundling to be 4 symbols, and then frequency hopping may be performed in units of 4 symbols. As shown in FIG. 7, the first hop starts from symbol 4 and occupies 4 symbols, namely symbols 4~7; the second hop starts from symbol 8, and occupies 4 symbols, namely symbols 8~11. The number of symbols of time-domain bundling configured by the base station may be the number of symbols occupied by nominal repetition, or the number of symbols occupied by actual repetition.

Frequency hopping is performed according to the bundling of numbers of the nominal or actual repetitions configured by the base station (the number of repetitions is bundled which is configured by the base station, and frequency hopping is performed with a time domain bundling as the time unit).

Taking FIG. 8 as an example, frequency hopping may be performed according to the bundling of numbers of the nominal or actual repetitions configured by the base station. For example, the base station may configure to bundle two nominal repetitions for frequency hopping. Then, the first hop is the first nominal repetition occupying symbols 4~7 of slot 1 and the second nominal repetition occupying symbols 8~11 of slot 1; the second hop is the third nominal repetition occupying symbols 12-13 of slot 1 and symbols 0~1 of time slot 2 and the fourth nominal repetition occupying symbols 3-6 of time slot 2.

For another example, the base station may configure to bundle two actual repetitions as a unit for frequency hopping. Then, the first hop is the first actual repetition occupying symbols 4~7 of slot 1 and the second actual repetition occupying symbols 9~11; the second hop is the third actual repetition occupying the symbol 12-13 of time slot 1 and the fourth actual repetition occupying symbols 0~1 of time slot 2; the third hop is the fifth actual repetition occupying symbols 3~6 of time slot 2. At this time, the number of the actual or nominal repetitions in the last hop may be less than or equal to the number of bundles configured by the base station.

Similarly, the nominal or actual repetitions may be replaced with other time units. For example, it can be replaced by bundling in units of several time slots for frequency hopping. This method can make the transmission on each frequency domain have a longer duration. For users with poor coverage or channel conditions, the channel estimation performance can be improved through the joint estimation of multiple DMRS, thereby obtaining better decoding performance.

The frequency domain position of each hop described above may be determined according to the information configured by the base station. For example, if the base station configures P frequency domain positions, the frequency domain position of the Qth hop is (j=Q mod P)th frequency domain position.

In addition, the above frequency hopping method may be implemented by configuring one of them by the base station or selecting one of them according to a predefined rule. Different PUCCH formats may configure or pre-define the same or different frequency hopping methods.

In addition, the above-mentioned frequency hopping method may also be used for repetition of time slots supported by the current protocol, and transmission of other uplink or downlink channels, such as PUSCH, PDSCH, SRS, etc.

Since PUCCH format 1 requires at least one DMRS and one information symbol used to carry UCI for transmission, if the number of symbols in the actual repetition is 1, it will be discarded, or only used to transmit DMRS, or with the adjacent actual repetitions are merged into a new actual repetition to improve performance.

In addition, since PUCCH format 0 theoretically may multiplex up to 6 users (using different orthogonal sequences). If spreading of PUCCH is supported, the number of multiplexed users can be further expanded. For example, one or two symbols may be used as a unit, and orthogonal sequences may be used for spreading. Different orthogonal code lengths may be configured for different numbers of repetitions. For example, as shown in Table 1, for the spreading code used for PUCCH format 1, the number T of symbols is replaced by the number of repetitions. i=0~6 may be obtained through the configuration of the base station to support different UEs, or the index in the spreading code may be calculated according to the cell ID. Alternatively, other orthogonal or quasi-orthogonal codes can be used as spreading codes. Compared with direct repetition, the use of spreading codes for PUCCH transmission can increase the number of multiplexed users (expand capacity), and at the same time, can further reduce inter-cell and intra-cell interference. Similarly, this method is also applicable to PUCCH format 2.

In addition, for PUCCH format 2, in order to reduce the interference between adjacent cells, the DMRS of PUCCH format 2 may be randomized in units of each slot (according to the slot index) or the number of (nominal or actual) repetitions. That is, the sequence of the DMRS and/or the occupied frequency domain position is determined according to the timing or the number of repetitions (nominal or actual).

In particular, for PUCCH format 2 or other PUCCH formats using Polar codes, as well as UCI transmission in other ways, due to the characteristics of the Polar code itself, it is necessary to ensure that the code rate used in each actual repetition or each code is the same. The coding rate (rate matching) may be determined according to one of the following methods: the number of REs in one nominal repetition, the number of REs in the shortest one in all actual repetitions, the number of REs in the longest one in all actual repetitions, the number of REs in the shortest one in the first actual repetition.

Figure 11:
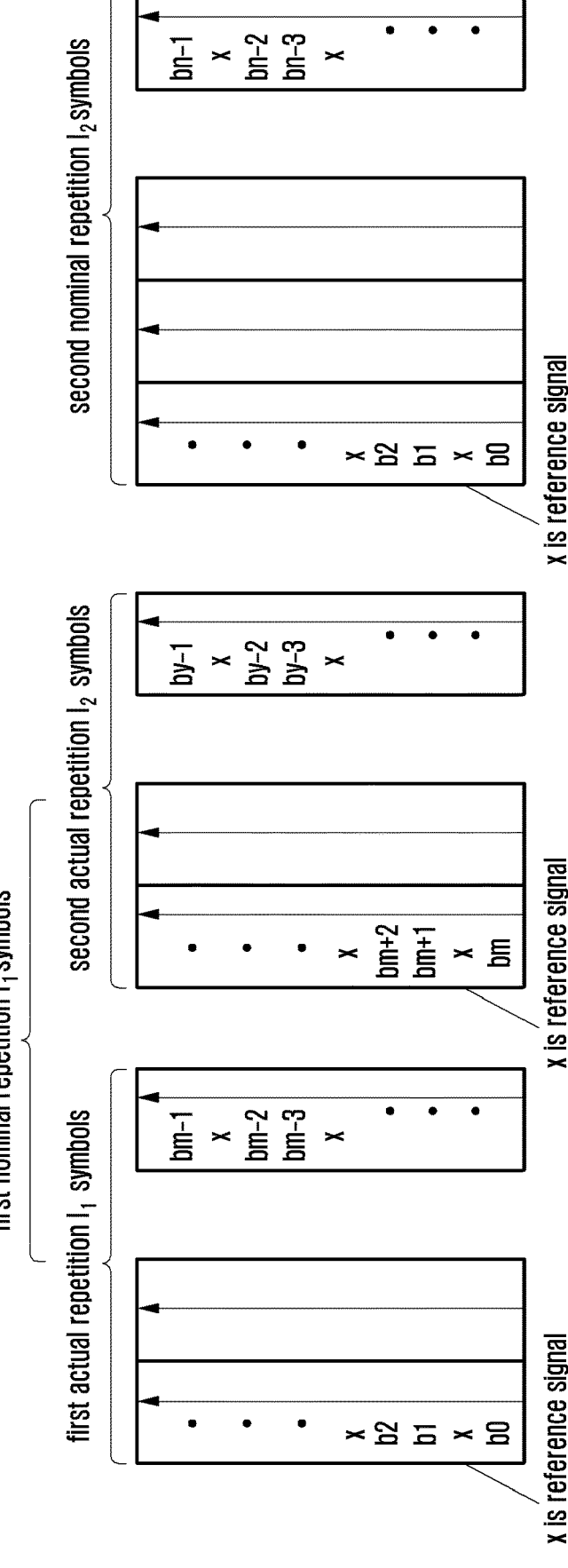
Figure 12:
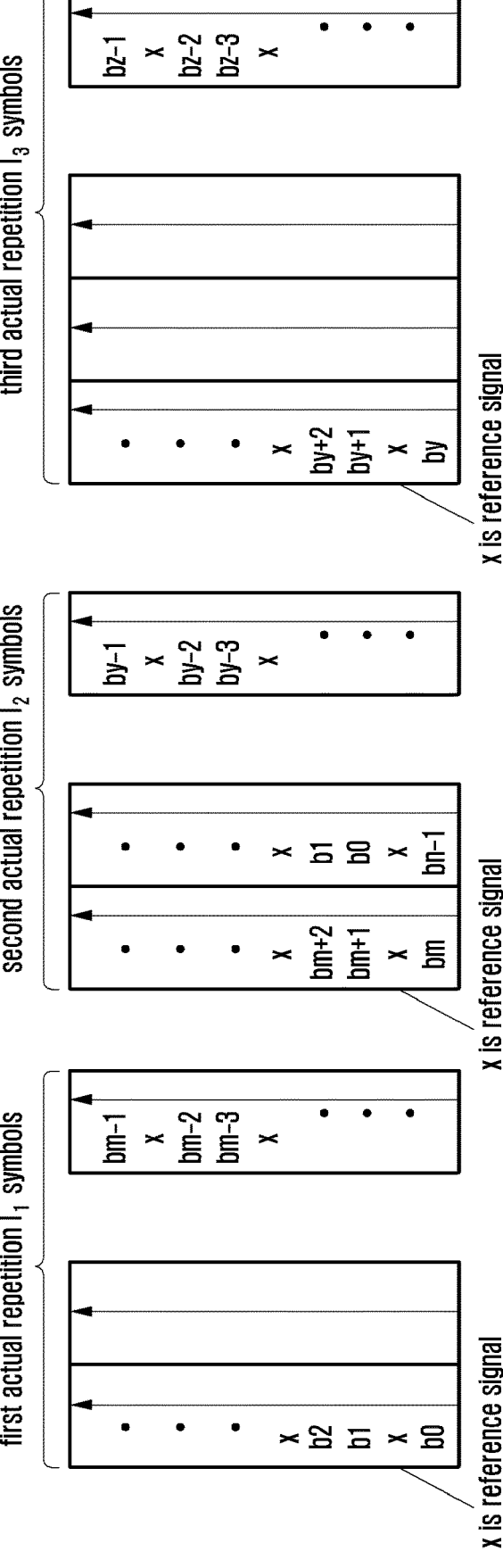

The above method may be used for the encoding method of Polar codes and short codes defined by 3GPP; or the above methods are only used for Polar codes, and for the encoding method of the short codes defined by 3GPP, rate matching may be performed on the number of available REs in each actual repetition FIGS. 10 to 12 illustrate various ways of mapping symbols for transmitting information to resource elements (REs)

on the time domain according to an example embodiment of the present disclosure. Specifically, it includes one of the following mapping methods:

Method A: Starting from the first RE in each actual repetition, the modulated symbols are mapped to each available RE in turn until no RE can be used for mapping.

As shown in FIG. 10, there are $l_1$ symbols in first actual repetition, where $l_1$,1<l, and there are $l_1$ symbols in the second actual repetition, where $l_2$=l, where l is the number of symbols configured by the base station for nominal repetition. The UE may perform rate matching according to the calculated code rate, and obtain n modulated symbols after performing steps such as modulation. According to pre-defined rules (for example, traverse different subcarriers of one symbol, and then traverse different symbols), the mapping starts from the first available RE of the first actual repetition until the completion of all $l_1$ symbols of the first actual repetition. Since the number $l_1$ of symbols of the first actual repetition is less than the number l of symbols of the nominal repetition, if rate matching is performed according to the number of available REs of the nominal repetition, the first actual repetition shown in FIG. 10 may not complete the mapping of all n modulated symbols b0~bn−1, and may only carry the first m modulated symbols b0~bm−1. The mapping is started from the first available RE in the second actual repetition of until the completion of all $l_2$ symbols of the second actual repetition. Since the number $l_2$ of the symbols of the second actual repetition is equal to the number l of symbols of the nominal repetition, if rate matching is performed according to the number of available REs of the nominal repetition, the second actual repetition as shown in FIG. 10 will map all n modulated symbols b0~bn−1. The x shown in the figure is a reference signal, and symbol mapping cannot be performed on x.

If the rate matching is performed according to the number of REs in the nominal repetition, this method will cause the previous information to be transmitted multiple times, while the subsequent information is transmitted less. This will affect the overall decoding performance. However, this method is simple and easy, which is suitable for situations where the number of symbols of the actual repetition is less than the number of symbols of the nominal repetition. In order to avoid this situation, the minimum number of symbols (number of REs) in the actual repetition may be used for rate matching. If the number of available REs in actual repetition is greater than the number of the modulated symbols, repeated mapping may be performed according to a predefined rule, for example, repeated mapping is performed from the first modulated symbol.

Method B: Starting from the first RE of the first actual repetition of each nominal repetition, the modulated symbols is mapped to each available RE of the actual repetition in turn, and then starting from the first RE of the next actual repetition, until there is no RE used for mapping in the last actual repetition of the nominal repetition.

As shown in FIG. 11, the first nominal repetition is segmented into two actual repetitions, where there are $l_1$ symbols in the first actual repetition, and there are $l_2$ symbols in the second actual repetition. The UE may perform rate matching according to the calculated code rate, and obtain n modulated symbols after performing steps such as modulation. According to pre-defined rules (for example, traverse different subcarriers of one symbol, and then traverse different symbols), the mapping starts from the first available RE of the first actual repetition until the completion of all $l_1$ symbols of the first actual repetition. The first actual repetition may not complete the mapping of all n modulated symbols b0~bn−1, and may only carry the first m modulated symbols b0~bm−1, where m<n. The first available RE in the second actual repetition of the first nominal repetition continues to be mapped from bm until the completion of all $l_2$ symbols of the second actual repetition. The second actual repetition completes the mapping of bm~by−1 symbols of the modulated symbols. For the method of rate matching according to the number of available REs for nominal repetition, if $l_1+l_2=l$, where l is the number of symbols of the nominal repetition, then the two actual repetition in the first nominal repetition as shown in FIG. 11 will map all n modulated symbols b0~by−1. In each nominal repetition, a new mapping starts from b0. As shown in FIG. 11, the second nominal repetition is the actual repetition and is not segmented and then the second nominal repetition starts the mapping from b0 to bn−1. The x shown in the figure is a reference signal, and symbol mapping cannot be performed on x.

This method makes it possible to complete as much data mapping as possible for each nominal repetition, and avoid the previous information from being transmitted multiple times similar to method A. However, if the total number of symbols of the actual repetitions in the nominal repetition is less than the number of REs used to calculate the rate matching, it will still cause fewer or missing symbol transmission times (energy) in the second half.

Method C: Starting from the first RE of the first actual repetition, the modulated symbols is mapped to each available RE of the actual repetition in turn, and then starting from the first RE of the next actual repetition, until there is no RE used for mapping in the last actual repetition of all actual repetitions.

As shown in FIG. 12, the common symbols are $l_1$, $l_2$, and $l_3$ symbols of the actual repetitions, respectively. The UE may perform rate matching according to the calculated code rate, and obtain n modulated symbols after performing steps such as modulation. According to pre-defined rules (for example, traverse different subcarriers of one symbol, and then traverse different symbols), the first available RE of the first actual repetition is mapped starting from b0 until the completion of all $l_1$ symbols of the first actual repetition. The first actual repetition may not complete the mapping of all n modulated symbols b0~bn−1, and may only carry the first m modulated symbols b0~bm−1. The first available RE of the second actual repetition continues to be mapped from bm. After completing the mapping of bn-1 modulated symbols, the mapping is restarted from b0 until the completion of all $l_2$ symbols of the second actual repetition. The second actual repetition completes the mapping of bm~bn−1 modulated symbols of the modulated symbols, and then continues to complete the mapping of b0 to by−1 modulation symbols. The first available RE of the third actual repetition continues to be mapped from by to the modulation symbol bz−1 until the completion of all $l_3$ symbols of the third actual repetition. The x shown in the figure is a reference signal, and symbol mapping cannot be performed on x.

This method can ensure complete transmission of modulated symbols. The missing of transmission will only appear in the last actual repetition. However, this method will cause the complexity of base station demodulation.

For the above methods A to C, if the number of REs available for mapping is greater than the number of symbols after modulation, the above mapping is repeated. When one PUCCH carries multiple separately coded UCIs, the number of REs occupied by the corresponding code rate of each UCI block is calculated according to the predefined rules, and mapping is according to the method of mapping high-priority UCI coding blocks first, and then mapping low-priority coding blocks. When the number of available REs is sufficient for mapping, the mapping is performed according to one of the above methods A to C.

The above method can be applied to other channels that use polar codes for repetition (including UCI transmission in PUSCH, PUCCH format 3/4, etc.), for the case where the number of REs used for information transmission in different repetitions is different.

In addition, the foregoing mapping method may configure one of them through the base station or select one of them according to a predefined rule. Different PUCCH formats may configure or pre-define the same or different mapping methods.

Figure 13:
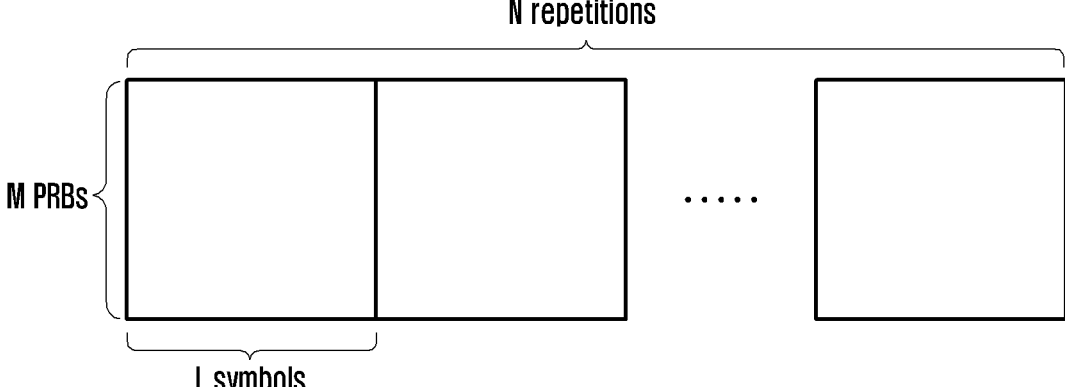
FIG. 13 schematically illustrates the relationship between the number of symbols, the number of PRBs, and the number of repetitions.

FIG. 13 schematically illustrates the relationship between the number of symbols, the number of PRBs, and the number of nominal or actual repetitions For PUCCH format 2 and PUCCH format 3, the base station needs to configure the maximum number of PRBs, the number of symbols, and the target code rate. The UE may calculate the required number of PRBs according to the number of bits of UCI and the target code rate and the number of symbols. Since the UCI load that needs to be reported at different times is different, the number of PRBs actually occupied may also be different.

However, for uplink transmission, due to the limited transmission power, occupying too much PRB will not improve performance. On the contrary, it will cause the SINR at the receiving end to be too low, thereby affecting the receiving performance. On the other hand, if the number of PRBs and the number of symbols occupied by one nominal or actual repetition of PUCCH is restricted at the same time, that is, the number of resources occupied by one nominal or actual repetition is restricted, then it will cause the encoding rate to be too low to obtain good coding benefits. Preferably, if rate matching is performed according to the nominal repetition, it corresponds to the number of resources occupied by the nominal repetition; if rate matching is performed according to the actual repetition, it corresponds to the number of resources occupied by the actual repetition. Therefore, one of the following methods may be used, and the following method is suitable for the nominal repetition or actual repetition:

The UE may obtain one or more of the following parameters from the base station or according to predefined rules: the maximum number of PRBs occupied in the frequency domain, the minimum number of symbols occupied by each nominal or actual repetition, the number of symbols increased each time, the maximum number of symbols occupied by each nominal or actual repetition, the target code rate, and the modulation method;

The UE may calculate the number of occupied PRBs according to one or more of the UCI load, the target code rate, the modulation mode, and the number of symbols occupied by the minimum repetition; if the maximum occupied PRB still cannot reach the target code rate, the number of symbols occupied by the time domain is increased with the number of symbols increased each time as the unit, until the target code rate is met.

In particular, the number of symbols increased each time can be 1 or other positive integers. The maximum number of PRBs occupied by the frequency domain is 1 or other positive integers. The maximum number of symbols occupied by each nominal or actual repetition is 14, or any positive integer.

Specifically, the UE may obtain that the maximum number of PRBs occupied by the frequency domain is 1, the minimum number of symbols occupied by each nominal or actual repetition is 1, the number of symbols increased each time is 1, the maximum number of symbols is 14 and the target code rate is 0.5. The PUCCH format 2 is used for transmission, and the UCI load is 30 bits. The number of REs that can be used for transmission in one symbol is 6. Because QPSK modulation is used, 30 REs are required to transmit 30 bits with QPSK at a code rate of 0.5, and the UE infers that a total of 5 symbols are required.

In particular, if the minimum number of symbols occupied by each nominal or actual repetition is equal to the number of symbols increased each time and is equal to the maximum number of symbols occupied by each nominal or actual repetition, the number of repetitions is determined according to the target bit rate, the number of occupied PRBS and the load. As shown in FIG. 13, the UE may obtain that the maximum number of PRBs occupied by the frequency domain is M, the minimum number of symbols occupied by each nominal or actual repetition is L, the number of symbols increased each time is also L, and the maximum number of symbols occupied by each nominal or actual repetition is L. Then the UE may determine the number N of the nominal or actual repetitions according to the target code rate. N=number of bits/(code rate*modulation order*number M of PRB*number of available REs in L symbols in each PRB). For example, if the number of bits is 30, the code rate is 0.5, the modulation order is 2, the maximum number M of PRBs is 1, and the number of REs in L=1 symbols is 6, then the number of repetitions N=30/(0.5*2*1*6)=5. This number of repetitions can be the number of the nominal or actual transmission. If other methods are used for repetition, for example, time slot repetition, the number of time slot repetition can also be used. The above-mentioned methods are not only for specific repetition schemes.

If the calculated number of required symbols exceeds the maximum number of symbols, there are two methods: method A) rate matching is performed according to the maximum number of symbols; method B) further repetition is introduced.

For the method B) that further repetition is introduced, there are two ways to calculate the number of the nominal or actual repetitions and the number of symbols in each nominal or actual repetition:

Method M): the number of symbols in each nominal or actual repetition is the maximum number of symbols, and the number of repetitions is set so that the equivalent code rate is less than the minimum value of the target code rate.

As in the above example, if the UCI load is 100 bits, there are a total of 84 REs in 14 symbols in one nominal or actual repetition, which cannot reach the target code rate, and two nominal or actual repetitions may be less than the target code rate. Then, the number of repetitions is 2.

Method N): the minimum number of symbols Ln required to reach the target code rate is calculated, then the number of the nominal or actual repetitions is the required minimum number of symbols divided by the maximum number L max of symbols for each nominal or actual repetition, and then round up, that is, N=[Ln/L max].

At this time, the number of symbols in each nominal or actual repetition may be [Ln/N]. In this way, the number of symbols in each nominal or actual repetition is equal. Or, the number of symbols in each nominal or actual repetition may be different. For example, the number of symbols for the last time or several times of the nominal or actual repetitions is relatively small.

As in the above example, if the UCI payload is 100 bits, in order to obtain the target code rate, 17 symbols are required, that is, 100/61=17, then the required number of repetitions N=117/141=2. Each nominal or actual repetition is 9 symbols, that is, 117/21=9. In this way, the first actual repetition is 9 symbols, and the second actual repetition is (remaining) 8 symbols.

The above method is also applicable to UEs with limited bandwidth.

The above method is also applicable to other repetition schemes including time slot repetition etc. supported by the current PUCCH.

Compared with the original method of determining the number of PRBs according to the target code rate, the above method is equivalent to concentrating the transmission power of the UE in a smaller bandwidth. Since the UE usually determines the transmit power according to the occupied bandwidth, for UEs at cell edge (requiring coverage enhancement), the maximum transmission power may be used for transmission according to the configuration of the base station or pre-specified in the protocol. Specifically, the base station may use RRC to configure whether PUCCH transmission is performed by using at least one of the foregoing methods, and the maximum transmission power is used for transmission. Alternatively, if RRC is used to configure whether or not PUCCH transmission is performed by at least one of the above methods, the maximum transmission power is used for transmission.

In addition, the number of the nominal or actual repetitions of the PUCCH may be dynamically indicated by the base station in the DCI or calculated by the UE according to a predefined rule. For example:

A new field is added to the DCI to directly clearly indicate number of the nominal or actual repetitions of the PUCCH. This method needs to increase the load of the DCI, which may affect the decoding performance of the DCI. But this method is simple to implement.

When RRC (Radio Resource Control) configures the dynamically indicated PUCCH resources for the UE, the number of the nominal or actual repetitions is additionally configured for each resource. This method does not increase the load of DCI. The existing method of indicating 16 PUCCH resource fields may be used, and the required number of the nominal or actual of repetitions is indicated while indicating the PUCCH resources. Alternatively, 16 PUCCH resources may also be expanded to more, which can provide greater flexibility and more choices, but it may need to increase the load of the DCI.

UE infers it according to other parameter correlation, for example, the number of repetitions, code rates, aggregation levels, etc. of a specific channel (e.g., PDCCH, PDCSH, PUSCH, SRS, etc.). The base station may configure the corresponding mapping relationship through RRC. For example, the aggregation level of the PDCCH corresponds to the number of the nominal or actual repetitions of the PUCCH, the number of the nominal or actual repetitions of the different PUCCH corresponds to the threshold of the PDSCH coding rate.

For example, the UE may determine the number of the nominal or actual of repetitions required for PUCCH according to the PDSCH code rate and/or the number of repetitions. The PDSCH is the nearest PDSCH corresponding to the HARQ-ACK codebook in UCI, or the PDSCH that requires the most repetitions and/or the lowest code rate among all the corresponding PDSCHs, or the PDSCH that indicates the PDCCH scheduling of PUCCH, etc.

For example, the UE may determine the number of the nominal or actual repetitions of the PUCCH according to the aggregation level of the PDCCH and/or the number of repetitions of the PDCCH. The PDCCH may indicate the PDCCH of the PUCCH resource, or the largest PDCCH aggregation level and/or the number of repetitions in the PDCCH search space. If the aggregation level and/or the number of repetitions of the PDCCH may be ambiguous, for example, the base station sends an aggregation level 8 but the UE has good channel conditions, the PDCCH candidate at the aggregation level 4 correctly decodes the PDCCH. Then, the actual PDCCH aggregation level and/or the number of repetitions need to be indicated in the DCI or PDSCH. Alternatively, the UE may determine the number of the nominal or actual repetitions of the PUCCH according to the aggregation level and/or the number of repetitions of the successfully decoded PDCCH. The base station may need a certain amount of blind detection of different possible PUCCH nominal or actual repetition times to complete PUCCH detection or decoding.

Similarly, the above method for determining the number of PUCCH nominal or actual repetitions is also applicable to determining the number of symbols and/or the number of occupied PRBs in one nominal or actual repetition of PUCCH.

The above method is also applicable to other repetition schemes including time slot repetition etc.

Different PUCCH formats may use different repetition methods. The base station may configure different repetition methods for different PUCCH formats through RRC. The base station can enable or disable some of the methods in this specification in the signaling for configuring the PUCCH. Alternatively, the base station may additionally enable a mode, for example, the coverage enhancement mode. Once the base station enabled this mode, the UE may use one or more of the above methods. For example, the base station may enable the coverage enhancement mode in the system information. For example, it is indicated through direct explicit signaling, or implicitly by the parameters of some public messages. Specifically, the base station may configure repetition for Msg3, and/or configure repetition for HARQ-ACK of Msg4, and so on.

According to an implementation of the present invention, a transmission method of an uplink control channel is provided. The method comprises: obtaining configuration information related to a nominal repetition; determining resource locations of one or more actual repetitions according to the configuration information related to the nominal repetition; and transmitting information according to the resource locations.

According to the embodiment, determining resource locations of one or more actual repetitions according to the configuration information related to the nominal repetition may comprise determining the time domain resource location of the nominal repetition according to the configuration information related to the nominal repetition, and determining the time domain resource location of the nominal repetition as the time domain resource location of the actual repetition According to the embodiment, determining resource locations of one or more actual repetitions according to the configuration information related to the nominal repetition may comprise combining consecutive symbols among the symbols occupied by one or more nominal repetitions in each of one or more time slots, and transmitting the combined symbols as one actual repetition.

According to the embodiment, the transmission method may further comprise determining the spreading codes in time domain according to the number of symbols in each actual repetition.

According to the embodiment, the transmission method may further comprise using at least one of the followings when invalid symbol appears in the continuous symbols occupied by one nominal repetition: discarding the transmission to be performed on the invalid symbol; segmenting the one nominal repetition into one or more actual repetitions at the invalid symbol; and postponing the transmission to be performed on the invalid symbol.

According to the embodiment, the transmission method may further comprise using at least one of the followings when a time slot boundary appears in a continuous symbols occupied by one nominal repetition: segmenting the one nominal repetition into one or more actual repetitions at the time slot boundary; not segmenting the one nominal repetition into one or more actual repetitions at the time slot boundary; and postponing the one nominal repetition until after the time slot boundary.

According to the embodiment, the transmission method may further comprise determining a coding rate of the nominal or actual repetition according to one or more of the followings: the number of resource elements (REs) in one nominal repetition, the number of REs in the shortest one in all actual repetitions, the number of REs in the longest one in all actual repetitions, the number of REs in the shortest one in the first actual repetition.

According to the embodiment, the transmission method may further comprise determining a coding rate of the actual repetition according to the number of available REs in each actual repetition.

According to the embodiment, the transmission method may further comprise mapping symbols for transmitting information to corresponding RE by one of the followings: starting from the first available RE in each actual repetition, mapping the symbols to each available RE in turn, until the last available RE in the actual repetition; starting from the first available RE in the first actual repetition of each nominal repetition, mapping the symbols to each available re in turn, until the last available RE in the last actual repetition of that nominal repetition; and starting from the first available RE in the first actual repetition of all actual repetitions, mapping the symbols to each available RE in turn, until the last available RE in the last actual repetition of all actual repetitions.

According to the embodiment, the transmission method may further comprise obtaining one or more of the followings from a base station or according to a predefined rule: the maximum number of physical resource blocks (PRBs) occupied in frequency domain, the minimum number of symbols occupied in each nominal or actual repetition, the number of symbols added each time, the maximum number of symbols occupied in each nominal or actual repetition, the target coding rate and the modulation mode.

According to the embodiment, the transmission method may further comprise calculating the number of occupied PRBs according to one or more of the UCI load, the target code rate, the modulation mode, and the number of symbols occupied by the minimum repetition; if the maximum PRB still cannot reach the target code rate, the number of symbols occupied by the time domain is increased with the number of symbols increased each time as the unit, until the target code rate is met.

According to the embodiment, when the number of symbols in each nominal or actual repetition is the maximum number of symbols, the number of one or more nominal or actual repetitions is set such that the equivalent coding rate is less than the minimum value of a target coding rate.

According to the embodiment, determining the number of one or more nominal or actual repetitions according to at least one of the followings: the number of nominal or actual repetitions, the minimum number of symbols required to meet the target coding rate, and the maximum number of symbols of each nominal or actual repetition.

According to the embodiment, the number of symbols of each nominal or actual repetition according to at least one of the followings: the number of the nominal or actual repetitions, and the number of symbols in each nominal or actual repetition.

According to the embodiment, the transmission method may further comprise transmitting information at maximum transmission power according to the base station configuration or predefined rules.

According to the embodiment, the transmission method may further comprise determining the number of one or more nominal or actual repetitions according to the dynamic indication set in the downlink control information (DCI) or the radio resource control (RRC).

According to the embodiment, the transmission method may further comprise determining the number of one or more nominal or actual repetitions according to the number of repetitions, coding code rate and aggregation level of a specific channel, wherein the specific channel includes a physical downlink control channel (PDCCH), a physical downlink shared channel (PDSCH), a physical uplink shared channel (PUSCH) and a sounding reference signal (SRS).

According to the embodiment, the transmission method may further comprise supporting at least one of the following frequency hopping methods: frequency hopping is performed in units of each nominal or actual repetition; frequency hopping is performed in units of time slots when crossing multiple time slots; frequency hopping according to the first half and the second half of the number of symbols actually occupied in each time slot; frequency hopping is performed in units of half symbols of each nominal or actual repetition; frequency hopping is performed in time units of one time-domain bundling when the number of symbols of time-domain bundling is configured by the base station; and frequency hopping is performed in time units of one time-domain bundling when the number of the repetitions of bundling is configured by the base station.

In order to reduce the complexity of the UE, the 5G NR system may support one or more types of UEs with Reduced Capability (RedCap). RedCap UEs have a smaller RF bandwidth than non-RedCap UEs. For example, in the FR1 band, RedCap UEs have only 20 MHz bandwidth, while non-RedCap UEs need to support 100 MHz bandwidth.

The existing 5G NR system can configure an initial bandwidth part (iBWP) in the SIB. In the FR1 frequency band, because non-RedCap UEs can support a bandwidth of 100 MHz, iBWP can be configured with a bandwidth of no more than 100 MHz. In order to support low-bandwidth RedCap UEs, the base station can limit the configuration of iBWP bandwidth that is not greater than the bandwidth capability of the RedCap UE, and share it with non-RedCap UEs. However, this method may limit the performance of non-RedCap UEs, for example, may cause PDCCH congestion. Therefore, the RedCap UE can perform RF tuning to enable it to work on BWP with a larger bandwidth. Or, BWPs are configured for non-RedCap UEs and RedCap UEs separately.

Therefore, the invention provides a method performed by a user equipment (UE) in a mobile communication system, comprising:

obtaining the configuration information of one or more bandwidth block (BWPs);

obtaining a BWP switching instruction information;

performing BWP switching according to the BWP switching instruction information.

Alternatively, the method may also include at least one of the followings:

obtaining the frequency domain positions of the one or more BWPs according to the information related to the frequency domain starting position of the reference BWP and the information related to offset with respect to the frequency domain starting position of the reference BWP in the configuration information; and obtaining the frequency domain position of the one or more BWPs according to the carrier frequency domain starting position of the one or more BWPs and the offset with respect to the carrier starting position in the configuration information.

Alternatively, performing BWP switching comprises at least one of the followings:

performing BWP switching according to the related information of time required for BWP switching;

performing BWP switching according to the related information of loading method for the channel configuration information on BWP after BWP switching;

performing BWP switching according to the related information of processing mode for the channel and signal on the current BWP;

performing BWP switching according to the related information of BWP type corresponding to BWP index;

performing BWP switching according to the switching method of BWP indicated in the configuration information.

The above method is described below through specific examples. One or more bandwidth blocks (BWPs) correspond to the BWP for the RedCap UE, and the reference BWP corresponds to the BWP for the non-RedCap UE.

Specifically, in the current 5G NR system, the ServingCellConfigCommonSIB message of SIB1 can be configured for uplink and downlink respectively. For example, in the DownlinkConfigCommonSIB radio resource control information for downlink configuration, the downlink frequency location (frequencyInfoDL) and the configuration information BWP-DownlinkCommon of the downlink iBWP may be configured. The starting position of the frequency domain of the downlink carrier (for example, PRB 0) will be determined according to one common reference frequency domain position (Point A) and the offset from the frequency domain position of the downlink carrier to the common reference frequency domain position Point A. In BWP-DownlinkCommon, the reference PRB position of the BWP can be indicated, where the sub-carrier spacing indicated in the BWP is taken as the sub-carrier spacing, and the starting position of the downlink frequency of the carrier is taken as the starting point (PRB 0). Similarly, the position of the uplink carrier can also be obtained based on the offset to the common reference frequency domain position Point A. Or, it can directly indicate the absolute frequency of the uplink carrier.

Figure 14:
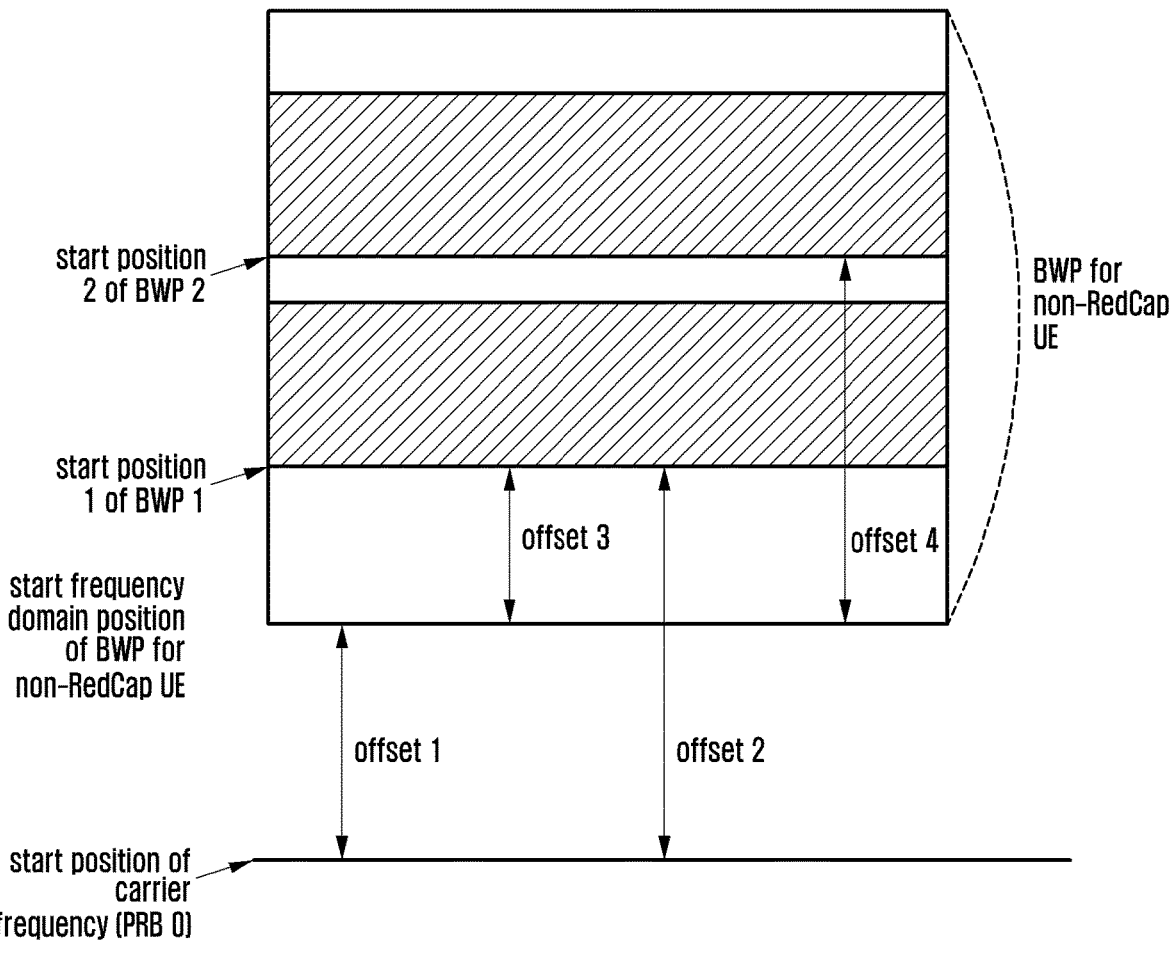
FIG. 14 schematically illustrates the frequency domain position of BWP for RedCap The text and drawings are provided as examples only to help understand the present disclosure. They should not be interpreted as limiting the scope of the present disclosure in any way. Although certain embodiments and examples have been provided, based on the disclosure herein, it will be apparent to those skilled in the art that changes may be made to the illustrated embodiments and examples without departing from the scope of the present disclosure.

Generally, if the BWP for the RedCap UE and the BWP of the non-RedCap UE have overlap, in order to enable the RedCap UE and the non-RedCap UE to coexist, the same subcarrier spacing may be used. It is also possible to configure different subcarrier spacings for the BWP for RedCap UEs and the BWP for non-RedCap UEs. The RedCap UE can obtain the frequency domain position of the BWP for the RedCap UE in at least one of the following methods:

Method 1: Obtaining the frequency domain position of the one or more BWPs according to the offset of the frequency domain start position of the BWP for the nonRedCap UE and the frequency domain start position of the BWP for the non-RedCap UE. Specifically, the UE may obtain according to the offset of the starting position of the PRB at the lowest frequency domain position in the BWP for the non-RedCap UE and the frequency domain position of the BWP for the non-RedCap UE. As shown in FIG. 14, the offset of the start frequency domain position of the BWP1 for the RedCap UE and the start frequency domain position of the BWP for the non-RedCap UE is offset 3. The offset of the start frequency domain position of the BWP2 for the RedCap UE and the start frequency domain position of the wide BWP is offset 4.

The UE may determine the frequency domain position of one or more BWPs for the UE according to the start position of the PRB at the lowest frequency domain position in the BWP of the non-RedCap UE, and the offset 3 and/or the offset 4.

The advantage of this approach is that the number of bits required for the indication can be saved. In particular, the number of bits required can be determined according to the BWP bandwidth of the non-RedCap UE. It can jointly indicate the frequency start position of the BWP and the bandwidth occupied by the BWP (such as the number of PRBs of the BWP).

Method 2: Obtaining the frequency domain position of the BWP according to the frequency domain start position of the carrier where the BWP is located and the offset from the carrier start position. Obtaining is according to the starting position (PRB 0) of the carrier frequency domain and the offset from the starting position of the carrier. The indication is the offset from the starting position (PRB 0) of the carrier frequency. As shown in FIG. 14, the offset of the frequency start position of the BWP1 for the RedCap UE and the carrier frequency domain start position (PRB 0) is offset 1. The UE may obtain the frequency domain position of the BWP for the UE according to the carrier frequency domain start position (PRB 0) and offset 1 from the carrier start position.

This method is more flexible, and is especially suitable for scenarios where the BWP for the RedCap UE and the BWP for the non-RedCap UE use different subcarrier spacings, or the BWP for the RedCap UE is not a subset of the BWP for the nonRedCap UE.

The above method is suitable for obtaining the frequency domain position of the uplink BWP, and is also suitable for obtaining the frequency domain position of the downlink BWP. The base station needs to indicate corresponding information for the UE so that the UE can obtain the frequency domain position of the BWP. The above method is suitable for the RedCap UE to obtain the BWP position, and it is also suitable for other types of UEs to obtain the BWP position.

In addition, in order to enable the UE to perform faster BWP switching, the RedCap UE can be configured with basic information of a plurality of BWPs. The basic information of the BWP includes at least one of the followings: the frequency domain position sub-carrier spacing of the BWP and the cyclic prefix CP and other information.

Example of the basic information of BWP:

TABLE 2

| BWP ::= SEQUENCE { | |
| --- | --- |
| locationAndBandwidth | INTEGER (0 .. 37949), |
| subcarrierSpacing | SubcarrierSpacing, |
| cyclicPrefix | ENUMERATED { extended } |
| } | |

Example of configuring the basic information of a plurality of BWPs:

TABLE 3

| BWP-DownlinkCommon ::= | SEQUENCE { |
| --- | --- |
| genericParameters-RedCapList | SEQUENCE (SIZE (1 .. maxBMPs)) OF BWP, |
| pdcch-ConfigCommon SetupRelease { PDCCH-ConfigCommon } | |
| pdsch-ConfigCommon SetupRelease { PDSCH-ConfigCommon } | |
| ... | |
| } | |

Due to the configuration of information of a plurality of BWPs, sharing part or all of the channel configuration information can avoid the UE from frequently loading channel configuration-related RRC configurations during the BWP switching process, resulting in shortening the BWP switching time and saving power consumption.

In addition, fixing some basic information of the BWP can reduce the switching time of the BWP, for example, fixed BWP bandwidth, and/or fixed subcarrier spacing, etc.

It is possible to define or configure different BWP switching methods and/or conditions for using different BWP switching methods to the UE. The different BWP switching methods may include at least one of the followings: the time required for the BWP switching, the method of loading channel configuration information on the BWP after the BWP switching, and the method of processing channels and signals on the current BWP.

The conditions for applying different BWP switching methods can be defined or configured. It can be defined to switch to BWP switching method A between BWPs that fix some BWP configuration information (for example, including basic information and channel configuration information), and the BWP switching method that is not shared is BWP switching method B. For example, if switching between BWPs that use the same subcarrier spacing and/or have the same bandwidth, the BWP switching method A is used, otherwise, the BWP switching method B is used.

It is possible to define or configure different BWP switching times for different BWP switching methods and/or keep part of the configuration information unchanged, etc. For example, for BWP switching method A, there may be no need to reactivate the downlink semi-persistent scheduling PDSCH, uplink configuration grant, etc.; and/or no need to discard the PDSCH feedback received before the BWP switching, etc. For BWP switching method B, it is necessary to reactivate the downlink semi-persistent scheduling PDSCH, uplink configuration grant, etc. and/or discard the PDSCH feedback received before the BWP switching, etc. In addition, different BWP switching times can be defined or configured for different BWP switching methods.

Different BWP basic information configuration methods can be defined or configured. For example, in order to indicate the plurality of BWPs with only different starting frequency domain positions, the starting frequency domain positions of the BWPs may be directly indicated. Or the number of BWPs is indicated, and the starting frequency domain position of each BWP is calculated according to a predefined rule, for example, starting from the first frequency domain position, each BWP occupies M PRBs, and N consecutive BWPs.

The indication methods for different BWP switching methods may include:

Method 1: Determining the BWP switching method according to the BWP type corresponding to the BWP index. For example, the BWP configuration with fixed and non-fixed information is sorted uniformly, such as configuring the BWP index bwp-Id. The BWP indication field in the DCI is used for unified indication. The UE bwp-Id and other methods determine the BWP switching method. In addition, the switching time corresponding to different switching methods, whether to clear the configuration, etc. is applied. In addition, the 2 bits in the existing DCI format can be expanded to more bits, thereby realizing more flexible switching. At this time, the status of different BWP configuration methods is equivalent.

This method saves the overhead of DCI.

Method 2: Selecting the BWP switching method according to the BWP switching method indicated in the BWP configuration information. The base station can configure the switching method for each BWP. In the configuration information of the BWP, the BWP switching method can be directly indicated or indirectly indicated. For example, BWP switching method A can be defined as sub-BWP switching or sub-bandwidth switching. Then, the UE can determine whether the BWP is a child BWP belonging to a parent BWP according to the BWP configuration information to determine whether the switching method of the BWP is switching method A.

This method saves the overhead of DCI.

Method 3: Selecting the BWP switching method according to the BWP switching indication. For example, as in the previous example of configuring the basic information of the plurality of BWPs, the parent BWP has one bwp-Id, and each child BWP with a different BWP basic information configuration has an additional index bwp-extra-Id. An additional field can be added to the DCI format to indicate the switching of the sub-BWP. The size of this field can be determined according to the number of sub-BWPs. When the number of child BWPs corresponding to different parent BWPs is different, the number of bits in the field is determined according to the maximum number of child BWPs, or the number of bits is obtained by the RRC configuration. If the number of bits configured by RRC is less than the number of sub-BWPs, only the first few sub-BWPs are indicated. Alternatively, the BWP switching method can be directly indicated in the DCI.

This method is very flexible.

According to an implementation of the present invention, a receiving method of an uplink control channel is provided. The method comprises: transmitting configuration information related to a nominal repetition; determining resource locations of one or more actual repetitions according to the configuration information related to the nominal repetition; and receiving information according to the resource locations.

According to an implementation of the present invention, a user device is also provided, which comprises a memory and a controller. The memory is configured to store computer programs; and the controller is configured to execute the computer program to perform the foregoing transmission method of the uplink control channel.

According to an implementation of the present invention, a base station is also provided, which comprises a memory and a controller. The memory is configured to store computer programs; and the controller is configured to execute the computer program to perform the foregoing receiving method of the uplink control channel.

The above description of exemplary embodiments of the invention is not intended to be exhaustive or to limit the invention to the precise form disclosed. Although the present invention has described specific embodiments and examples of the present invention in detail for illustrative purposes, as those skilled in the relevant art will recognize, various modifications can be made within the scope of the present invention. These modifications can be made to the present invention based on the above detailed description. The terms used in the claims should not be construed to limit the present invention to the specific embodiments or examples disclosed in the specification. Rather, the scope of the present invention should be determined by the definitions in the claims, and the claims will be understood according to the established principles of the interpretation of the claims.

The invention claimed is:

1. A method performed by a user equipment (UE) in a communication system, the method comprising:
receiving, via radio resource control (RRC) signaling, physical uplink control channel (PUCCH) resource configurations corresponding to PUCCH resources, wherein each of the PUCCH resource configurations includes a repetition number configuration for a corresponding PUCCH resource;
receiving first downlink control information (DCI) indicating a first PUCCH resource;
identifying a first repetition number based on a first repetition number configuration in a first PUCCH resource configuration corresponding to the indicated first PUCCH resource;
transmitting, based on the indicated first PUCCH resource, a first PUCCH repeatedly over the first repetition number of slots;
receiving second DCI indicating a second PUCCH resource;
identifying a second repetition number based on a second repetition number configuration in a second PUCCH resource configuration corresponding to the indicated second PUCCH resource; and
transmitting, based on the indicated second PUCCH resource, a second PUCCH repeatedly over the second repetition number of slots.

2. The method of claim 1, wherein in case that frequency hopping for PUCCH transmission is configured, the frequency hopping is performed for the first PUCCH and the second PUCCH per certain time unit.

3. The method of claim 2, wherein the certain time unit is one of: one slot or a certain number of slots configured for the frequency hopping.

4. A user equipment (UE) in a communication system, the UE comprising:

a transceiver; and a processor coupled with the transceiver and configured to:

receive, via radio resource control (RRC) signaling, physical uplink control channel (PUCCH) resource configurations corresponding to PUCCH resources, wherein each of the PUCCH resource configurations includes a repetition number configuration for a corresponding PUCCH resource;

receive downlink control information (DCI) indicating a first PUCCH resource;

identify a first repetition number based on a first repetition number configuration in a first PUCCH resource configuration corresponding to the indicated first PUCCH resource;

transmit, based on the indicated first PUCCH resource, a first PUCCH repeatedly over the first repetition number of slots;

receive second DCI indicating a second PUCCH resource;

identify a second repetition number based on a second repetition number configuration in a second PUCCH resource configuration corresponding to the indicated second PUCCH resource; and transmit, based on the indicated second PUCCH resource, a second PUCCH repeatedly over the second repetition number of slots.

5. The UE of claim 4, wherein in case that frequency hopping for PUCCH transmission is configured, the frequency hopping is performed for the first PUCCH and the second PUCCH per certain time unit.

6. The UE of claim 5, wherein the certain time unit is one of: one slot or a certain number of slots configured for the frequency hopping.

7. A method performed by a base station in a communication system, the method comprising:

transmitting, via radio resource control (RRC) signaling, physical uplink control channel (PUCCH) resource configurations corresponding to PUCCH resources, wherein each of the PUCCH resource configurations includes a repetition number configuration for a corresponding PUCCH resource;

transmitting first downlink control information (DCI) indicating a first PUCCH resource;

receiving, based on the indicated first PUCCH resource, a first PUCCH repeatedly over a first repetition number of slots, wherein the first repetition number is configured by a first repetition number configuration in a first PUCCH resource configuration corresponding to the indicated first PUCCH resource;

transmitting second DCI indicating a second PUCCH resource; and receiving, based on the indicated second PUCCH resource, a second PUCCH repeatedly over a second repetition number of slots, wherein the second repetition number is configured by a second repetition number configuration in a second PUCCH resource configuration corresponding to the indicated second PUCCH resource.

8. The method of claim 7, wherein in case that frequency hopping for PUCCH transmission is configured, the frequency hopping is applied performed for the first PUCCH and the second PUCCH per certain time unit.

9. The method of claim 8, wherein the certain time unit is one of: one slot or a certain number of slots configured for the frequency hopping.

10. A base station in a communication system, the base station comprising:

a transceiver; and a processor coupled with the transceiver and configured to:

transmit, via radio resource control (RRC) signaling, physical uplink control channel (PUCCH) resource configurations corresponding to PUCCH resources, wherein each of the PUCCH resource configurations includes a repetition number configuration for a corresponding PUCCH resource;

transmit first downlink control information (DCI) indicating a first PUCCH resource; and receive, based on the indicated first PUCCH resource, a first PUCCH repeatedly over a first repetition number of slots, wherein the first repetition number is configured by a first repetition number configuration in a first PUCCH resource configuration corresponding to the indicated first PUCCH resource;

transmit second DCI indicating a second PUCCH resource; and receive, based on the indicated second PUCCH resource, a second PUCCH repeatedly over a second repetition number of slots, wherein the second repetition number is configured by a second repetition number configuration in a second PUCCH resource configuration corresponding to the indicated second PUCCH resource.

11. The base station of claim 10, wherein in case that frequency hopping for PUCCH transmission is configured, the frequency hopping is applied performed for the first PUCCH and the second PUCCH per certain time unit.

12. The base station of claim 11, wherein the certain time unit is one of: one slot or a certain number of slots configured for the frequency hopping.

* * * * *